(12) United States Patent
Berger et al.

(10) Patent No.: US 11,019,144 B2
(45) Date of Patent: *May 25, 2021

(54) COLLABORATIVE CLOUD-BASED DOCUMENT EDITING FROM A BROWSER-ENABLED PLATFORM NATIVE APPLICATION

(71) Applicant: Box, Inc., Redwood City, CA (US)

(72) Inventors: Jonathan Berger, Redwood City, CA (US); Ma Hnin Yu Aung, Pacifica, CA (US); Kenneth Yagen, Emerald Hills, CA (US); Brian James Emerick, Mountain View, CA (US); Naeim Semsarilar, San Carlos, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,715

(22) Filed: Aug. 12, 2019

(65) Prior Publication Data
US 2019/0364108 A1 Nov. 28, 2019

Related U.S. Application Data

(63) Continuation of application No. 15/421,296, filed on Jan. 31, 2017, now Pat. No. 10,382,547.

(51) Int. Cl.
*H04L 29/08* (2006.01)
*H04L 29/06* (2006.01)
*G06Q 10/10* (2012.01)

(52) U.S. Cl.
CPC ....... *H04L 67/1095* (2013.01); *G06Q 10/101* (2013.01); *H04L 67/141* (2013.01);
(Continued)

(58) Field of Classification Search
CPC . H04L 67/1095; H04L 65/403; H04L 67/141; H04L 67/42; H04L 69/14;
(Continued)

(56) References Cited

U.S. PATENT DOCUMENTS 5,787,175 A * 7/1998 Carter ................. G06F 21/6209
707/999.008
9,483,473 B2 11/2016 Ansel
(Continued)

OTHER PUBLICATIONS

"NW.js and Electron.js: Web Technology on the Desktop", URL: http://www.tivix.com/blog/nwjs-and-electronjs-web-technology-desktop/, May 13, 2015.
(Continued)

*Primary Examiner* — Benjamin M Thieu
(74) *Attorney, Agent, or Firm* — Vista IP Law Group, LLP

(57) ABSTRACT

Methods and systems for online collaboration. A method embodiment facilitates collaborative editing of a cloud-based shared document using a browser-enabled platform native application. A user launches a platform native application and establishes a non-browser connection between the platform native application and a remote cloud-based shared file facility. The non-browser connection operates independently from any browser connections even though the platform native application includes a document editor web app within the embedded browser. A first user retrieves a first user copy of the cloud-based shared document, modifies the document, and shares the modified document so as to be accessible by other collaborating users.

22 Claims, 14 Drawing Sheets

(52) U.S. Cl.
    CPC .......... *H04L 69/14* (2013.01); *H04L 65/1069* (2013.01); *H04L 67/02* (2013.01)

(58) Field of Classification Search
    CPC ..... H04L 65/1069; H04L 67/02; G06Q 10/10; G06Q 10/101
    See application file for complete search history.

(56) References Cited

U.S. PATENT DOCUMENTS

| | | | |
|---|---|---|---|
| 9,704,137 B2 | 7/2017 | Berger et al. | |
| 2011/0252304 A1* | 10/2011 | Lemonik | G06F 40/14 715/234 |
| 2011/0252312 A1* | 10/2011 | Lemonik | G06F 40/14 715/255 |
| 2011/0252339 A1* | 10/2011 | Lemonik | G06F 40/166 715/753 |
| 2015/0082196 A1* | 3/2015 | Berger | G06F 3/0484 715/753 |
| 2017/0024365 A1 | 1/2017 | Emerick et al. | |
| 2017/0147545 A1 | 5/2017 | Amoli et al. | |
| 2017/0331900 A1* | 11/2017 | Wang | H04L 67/125 |

OTHER PUBLICATIONS

"Operational transformation", URL: https://en.wikipedia.org/wiki/Operational_transformation, Jul. 29, 2016.

Notice of Allowance dated Apr. 1, 2019 for U.S. Appl. No. 15/421,296.

* cited by examiner

COLLABORATIVE CLOUD-BASED DOCUMENT EDITING FROM A BROWSER-ENABLED PLATFORM NATIVE APPLICATION

CROSS-REFERENCE TO RELATED APPLICATION(S)

The present application is a continuation of U.S. patent application Ser. No. 15/421,296, filed on Jan. 31, 2017, issued as U.S. Pat. No. 10,382,547 on Aug. 13, 2019, which is hereby incorporated by reference in its entirety.

FIELD

This disclosure relates to online collaboration, and more particularly to techniques for collaborative cloud-based document editing from a browser-enabled platform native application.

BACKGROUND

Many cloud services are supported through a web browser, however some document editing capabilities need resources beyond what such browsers support. For example, when using certain cloud-client services such as collaborative document editing, users expect rapid bring-up of a document that is being edited by the collaborators.

Unfortunately browsers by themselves are deficient in at least three aspects (1) browsers are limited with respect to the host platform storage areas that the browser can access; (2) browsers are limited with respect to the host platform operating system services that the browser can access; and (3) browsers observe predefined security models that are inflexible.

Moreover, in many settings standalone browser-based implementations introduce user-perceived start-up latency (e.g., to launch a browser, to log in to a service provider, to navigate to the particular cloud services, to access an up-to-date document, etc.). What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

DETAILED DESCRIPTION

Figure 1A:
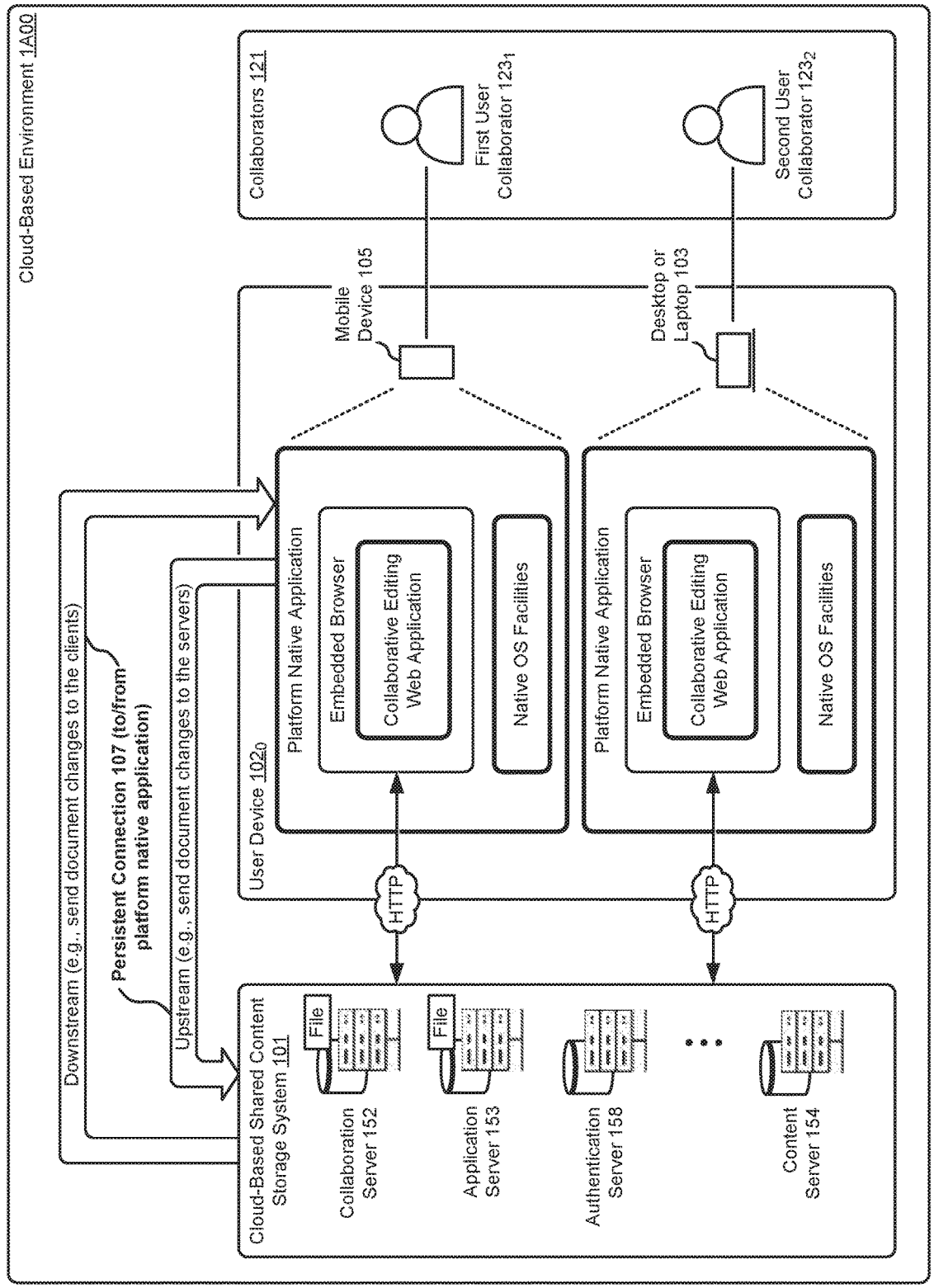
FIG. 1A exemplifies a collaboration system that supports collaborative cloud-based document editing from a browser or from a browser-enabled platform native application.

When multiple collaborators concurrently edit a shared document in a cloud-based collaboration system, some document editing capabilities need resources beyond what browsers support. Embodiments are disclosed herein that are directed to approaches for browser-enabled platform native applications that interface with a cloud-based collaborative storage system so as to eliminate or reduce start-up time associated with standalone browser implementations when initiating access to web-hosted services. The accompanying figures and discussions herein present example environments, systems, methods, and computer program products for collaborative cloud-based document editing from a browser-enabled platform native application.

Overview

Disclosed herein are methods and architectures for a browser-enabled platform native application that interfaces with a cloud-based collaborative storage system. Ongoing (e.g., online and offline) editing capabilities between multiple collaborators are supported from the platform native application. The disclosed methods include steps to accomplish collaborative cloud-based document editing from a browser-enabled platform native application.

In a sample environment, the method commences by providing shared access (e.g., to multiple collaborators) to a document that is stored in a remote cloud-based shared file facility. Any of the collaborators (e.g., multiple of the collaborators) can launch a native application from a desktop or laptop computer. The native application in turn invokes a browser or portions of a browser that operate from within the platform native application. Using such an embedded browser or portions of the embedded browser, a collaborator retrieves (e.g., downloads) a web application from the remote cloud-based shared file facility. The downloaded web application facilitates collaborative editing. Security (e.g., authentication and authorization) is provided through persistent or long-lived access tokens such that a user need only perform authentication steps once (e.g., from the platform native application). Access tokens resulting from successful authentication from the platform native application can persist for periods of time much longer than access tokens resulting from successful authentication from within a standalone browser session. In some cases, access tokens resulting from successful authentication from the platform native application can persist or be persisted throughout a power-up cycle. Several use models and several implementations of a platform native application having an embedded browser are presented hereunder.

Use Model Overview

In an example scenario, first collaborating user logs into a cloud service using a platform native application that invokes an embedded browser which in turn executes a web application delivered by the cloud service. The first collaborating user might then seek to edit a document that is, for example, already being shared by other collaborators (e.g., a second collaborating user, a third collaborating user, etc.). The first collaborating user issues commands through the platform native application and/or through the embedded browser to retrieve a then-current copy of the document. The user makes edits to the document, after which editing operations, the platform native application and/or the embedded browser application sends a representation of the modification(s) to the remote cloud-based shared file facility. The remote cloud-based shared file facility interprets the representation of the modification(s) and records the changes. Such changes can be delivered to any other collaborators such that all collaborating users will become in sync.

In accordance with the herein-disclosed embodiments, the collaborating users need not be actively viewing or manipulating the shared document in order for synchronization to occur. More specifically, since the platform native application supports long-lived authentication tokens, a background process on the user's device (e.g., desktop or laptop) can apply changes to the shared document at any moment in time. As such, the first collaborating user, the second collaborating user, etc. need not be actively viewing or manipulating the shared document in order for synchronization to occur.

Using a persistent, stateful connection that remains connected even when the user is not actively viewing or manipulating the document, changes from one collaborating user can be delivered to all other collaborators such that all collaborators have, or will have, the same documents with all modifications applied. Such modifications can be recorded at each collaborator's platform, which modifications can be subsequently applied to the shared document. Modifications can be applied whenever a platform is online, regardless of whether or not the user of the platform is actually actively viewing or manipulating the shared document. At such a time when a user desires to actively view or manipulate the shared document, the start-up time to is very short since (1) the user is already logged in (or can be automatically logged in by the platform native application), and (2) most or all modifications to the shared documents that had originated from other collaborators have been applied (e.g., by the foregoing background process).

Changes made by one collaborator using a first editing platform can be applied to a shared document held at a second editing platform. The changes can be applied in both active and inactive modes. Updates to documents that are held on any platform (e.g., desktop, laptop, etc.) can be made in the background at any time the device is online, including when a collaborator is merely online but not editing in an active mode. Low-latency bring-up of a collaborative editing session over a particular shared document is facilitated by maintenance of an up-to-date shared document cache on the editing platform.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies a collaboration system 1A00 that supports collaborative cloud-based document editing from a browser or from a browser-enabled platform native application. As an option, one or more variations of collaboration system 1A00 or any aspect thereof may be implemented in the context of the architecture and functionality of the embodiments described herein. The collaboration system 1A00 or any aspect thereof may be implemented in any environment.

As shown, user devices 102 (e.g., desktop or laptop 103, mobile device 105) interact with the cloud-based shared content storage system 101 based on uploads and downloads of operations (e.g., document editing operations) to be executed on a shared document over a persistent connection 107. The document or documents can be viewed or manipulated from one or more display screens (e.g., as generated in whole or part from within the browser, or generated in whole or part from within the platform native application, or both) and such display screens can be managed by a software application that executes on a user device (e.g., in or on a laptop or desktop computer).

The collaborative editing web application communicates over HTTP (as shown) using HTTP sockets and HTTP calls between its containing browser and the cloud-based shared content storage system 101. A persistent connection (e.g., one or more socket connections that are bidirectional) is opened to facilitate communication between the platform native application and the cloud-based shared content storage system 101. Such persistent communication connections can be stateful connections that persist even when the embedded browser is closed and/or even when there are no documents that are open/active in the embedded browser.

In some embodiments, and as shown, any number of collaborators 121 (e.g., first user collaborator $123_1$, second user collaborator $123_2$, and Nth user collaborator $123_N$) avail themselves of services provided by computing resources (e.g., collaboration server 152, application server 153, authentication server 158, and content server 154) that are within the cloud-based shared content storage system 101. Strictly as an example, a user might send document modifications (e.g., via the shown upstream path) that are destined for one or more of the computing resources of the cloud-based shared content storage system 101. Components of the cloud-based shared content storage system in turn process the document modifications and deliver all or portions of the document modifications (e.g., via the shown downstream path) to other user devices belonging to other collaborators.

As shown, a platform native application runs natively on a laptop or desktop user device. As earlier indicated, a platform native application (e.g., a desktop application) can access features (e.g., hardware features) of the user device without encumbrances pertaining to limitations that are inherent in a web browser. In some cases, and as shown, a platform native application can access native operating system facilities and/or use access any facilities of a file system running natively on the user device. In this environment, a native application can avail itself of all hardware and software facilities of the user device. In an exemplary embodiment, a platform native application is configured to embed a browser inside the platform native application. A platform native application with an embedded browser can be implemented in many variations. The collaborative editing web application may be partitioned into software layers that abstract implementation details of functions within the layers. Approaches using software layers to implement a browser-enabled platform native application are shown and discussed as pertains to FIG. 1B.

Figure 1B:
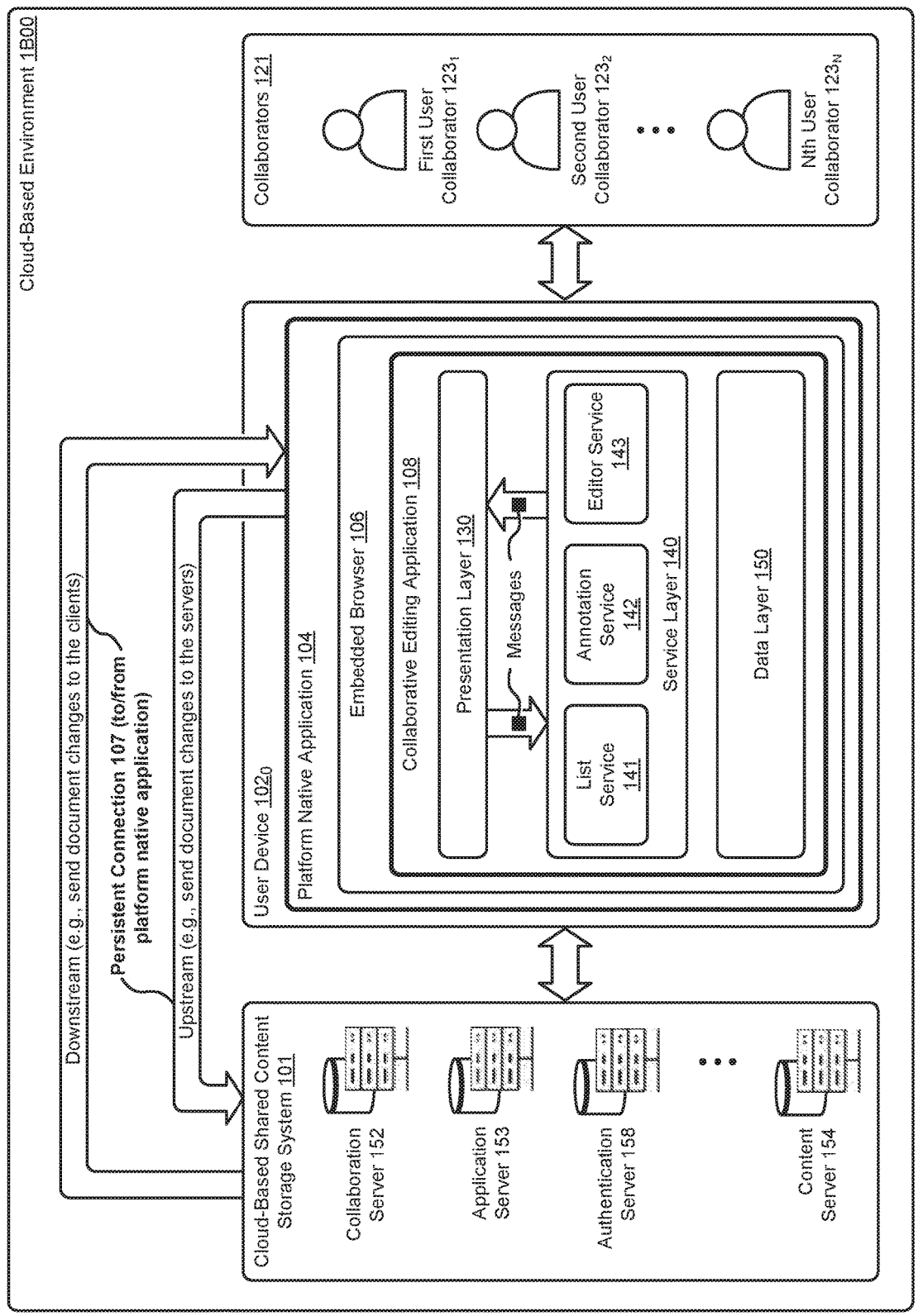
FIG. 1B exemplifies a collaboration editing system that includes a browser-enabled platform native application, according to an embodiment.

FIG. 1B exemplifies a collaboration editing system 1B00 that includes a browser-enabled platform native application. As an option, one or more variations of collaboration editing system 1B00 or any aspect thereof may be implemented in the context of the architecture and functionality of the embodiments described herein. The collaboration editing system 1B00 or any aspect thereof may be implemented in any environment.

The embodiment shown in FIG. 1B is merely one example. As shown, the collaboration editing system includes a user device $102_0$ in the embodiment of a desktop or laptop computer or mobile device. A collaborative editing application 108 is situated within an embedded browser 106. The collaborative editing application 108 uses resources from the embedded browser 106 as well as resources that are native to the platform. More specifically, the shown platform native application 104 is able to access platform native resources that the browser cannot access. For example, the platform native application can access files stored on the platform through platform native operation system functions, whereas the browser is limited in its ability to autonomously access files stored on the platform.

As shown, the platform native application supports a persistent connection 107 to the cloud-based shared content storage system. This persistent connection remains open even when the embedded browser is closed or inactive. In exemplary situations, the platform native application keeps the non-browser connection open and active whenever the platform is online. Moreover, the platform native application re-establishes an open and active instance of a new persistent connection whenever the platform returns to online status after being offline for a duration. Whenever online, the persistent connection can be used (e.g., for background tasks over a document) even when the embedded browser is inactive or closed.

The embedded browser itself can be implemented using any one or more, or any combinations of Nodejs, GitHub's Electron, WebKit, Chromium, Gecko, etc. The embedded browser supports a data layer 150, a presentation layer 130, and a service layer 140. The various functions of each layer and interactions between adjacent layers are described hereunder.

Service Layer

The service layer functions to receive requests for data from modules of the presentation layer, as well as fetching the data from the appropriate data source and returning the data back to the requesting module. As shown, the data source for the web application is from the application server.

Services of the collaborative editing application 108 such as collaborative editing list service 141 and/or annotation service 142 make calls (e.g., XMLHttpRequest (XHR) calls) to the application server 153 to retrieve data. These services rely in part on an express session (e.g., a web session in a cookie) for authentication and authorization. In some cases, an application server implements any known scheduling techniques (e.g., FIFO, FILO, round-robin scheduling, etc.). In one such example, a server that receives an XHR request first looks up the session from session storage. The access token is retrieved from the session object and used to make the call to the content server 154.

Real-Time Editor Service

Other services, such as the shown client-side real-time editor service 143, use a persistent connection (e.g., a stateful, non-browser web socket connection, possibly using a websocket protocol websocket from the socket.io library) to communicate with a specific application server. The persistent connection is long-lived and remains open even when the embedded browser is closed. The service layer exposes a unified interface across all interfacing callers to/from other layers. This service uses a socket connection to communicate with the application server. This service also communicates with a server-side and/or client-side document caching service to facilitate loading and editing documents while offline.

The platform native application 104 communicates with the client-side real-time editor service 143, possibly through the embedded browser, and/or possibly through the collaborative editing application 108. When the platform native application is initialized, it will request that the editor service carry out a protocol to establish communication connections with the server. The editor service responds back with initial content to show in the editor. User edits are sent (e.g., via upstream communications of operational transforms) to the server via the socket. Other users edits are received (e.g., via downstream communications of operational transforms) from the server and relayed to the editor. The editor merges the other users edits and displays the results using one or more presentation facilities as may be provided in one or more presentation layers (e.g., a presentation layer native to the embedded browser, and/or a presentation layer native to the platform native application and/or a presentation layer native to the user device). Presentation layer facilities are conducive to collaborative editing, and any native partitions or layers can be augmented with additional functions through use of collaborative editing application extensions. Collaborative editing application extensions are discussed further, below.

Presentation Layer

This layer comprises user interface (UI) modules and widgets such as toolbars, documents lists, comments or other annotations, which combine to form an editor user interface. In some cases the editor code is written in HTML and/or JavaScript and/or cascading style sheets (CSS) or any combinations thereof. In this embodiment, each of the aforementioned UI modules can stand-alone, merely requiring an instance on a web page. These modules broadcast messages and listen for messages in the performance of their respective functions. For example, the editor module might broadcast "cursor moved to a location over a button". An instance of a toolbar might react by changing the button color to a contrasting color.

Modules acquire data by calling a related service (e.g., peer services in the service layer). For example, on initialization, the client-side real-time editor service 143 might ask the list service 141 for a list of documents to show. The list service would then call the application server 153 and ask for a list of documents to show.

Figure 1C:
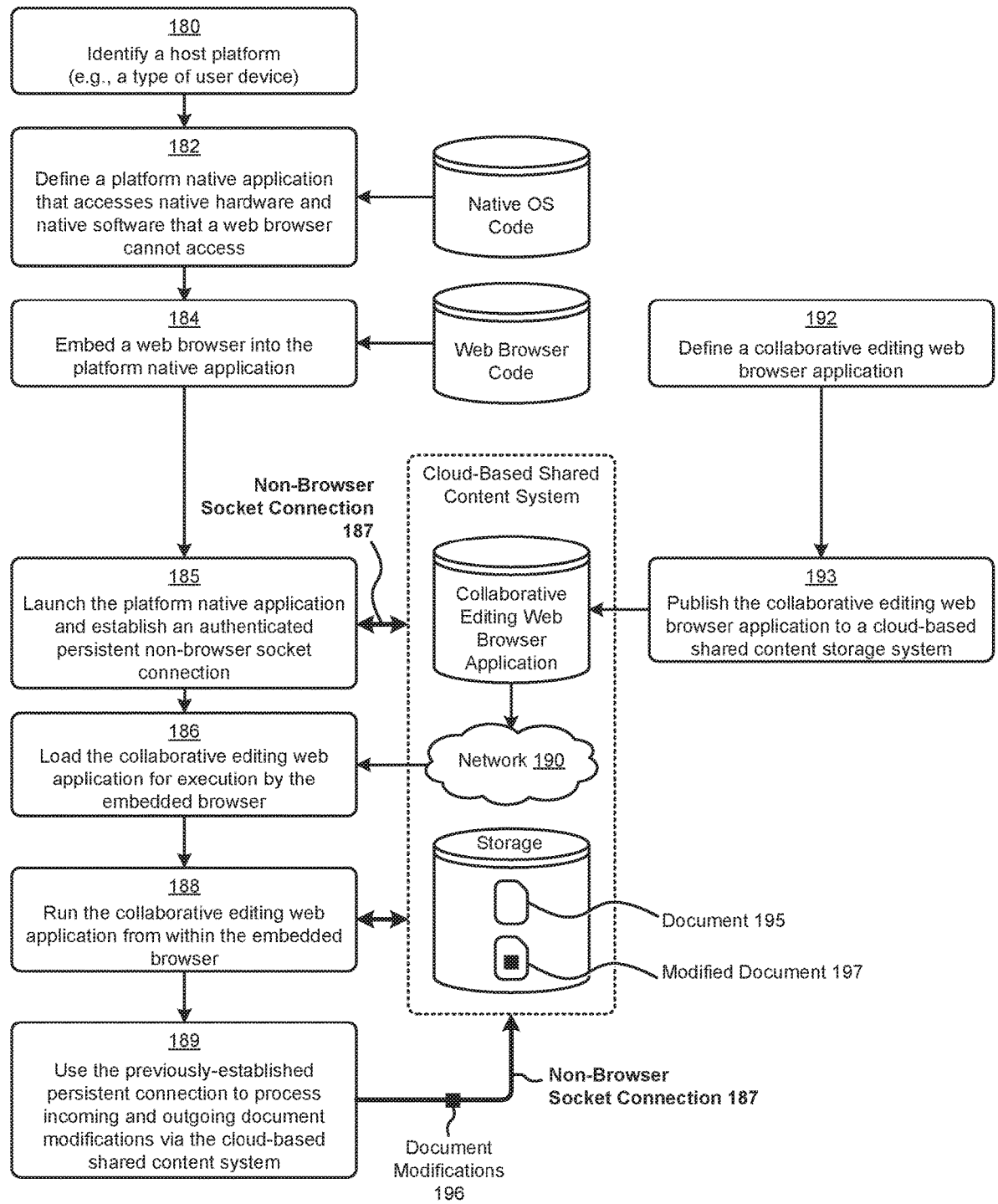
FIG. 1C is a flowchart depicting a deployment technique for implementing collaborative cloud-based document editing from a browser or from a browser-enabled platform native application, according to an embodiment.

FIG. 1C is a flowchart depicting a deployment technique for implementing collaborative cloud-based document editing from a browser or from a browser-enabled platform native application. The shown flow commences upon identifying a particular platform that has a particular set of hardware and operating system characteristics (step 180). Based on the identified particular set of hardware and operating system characteristics, an application developer defines or codes a platform native application (step 182) that accesses platform-native operating system functions and/or that accesses platform-native hardware functions. As part of the development process, the developer may access native OS code (e.g., libraries). Further, as part of the development process, the developer may access web browser code (e.g., libraries), portions of which code can be used to form a browser that is embedded in the platform native application (step 184). The browser that is embedded in the platform native application is sufficiently fully-featured so as to facilitate download of a web application. Such a web application can be developed to support collaborative editing (step 192). A collaborative editing web browser application has limitations that are imposed by a compliant web browser. As such the aforementioned platform native application serves to perform operations on the host platform that cannot be performed by a compliant browser. The collaborative editing web browser application is published to a cloud-based shared content storage system (step 193) such that the aforementioned platform native application can download the collaborative editing web browser application over network 190.

A user operating a host platform invokes the platform native application (step 185), which in turn authenticates with the cloud-based shared content storage system to establish an authenticated instance of a persistent, non-browser socket connection 187. The platform native application cooperates with the embedded browser to load the published web application (step 186). The collaborative editing web browser application is run from within the embedded browser (step 188). In the course of running the collaborative editing web browser application, (1) a document 195 is received over the network, (2) any number of local and/or collaborative instances of modifications 196 to the document are sent and/or received, and (3) a modified document 197 is stored in persistent storage in the cloud-based shared content storage system (step 189).

On particular partitioning of modules that perform operations pertaining to the flow of FIG. 1C is presented in the following figures.

Figure 2:
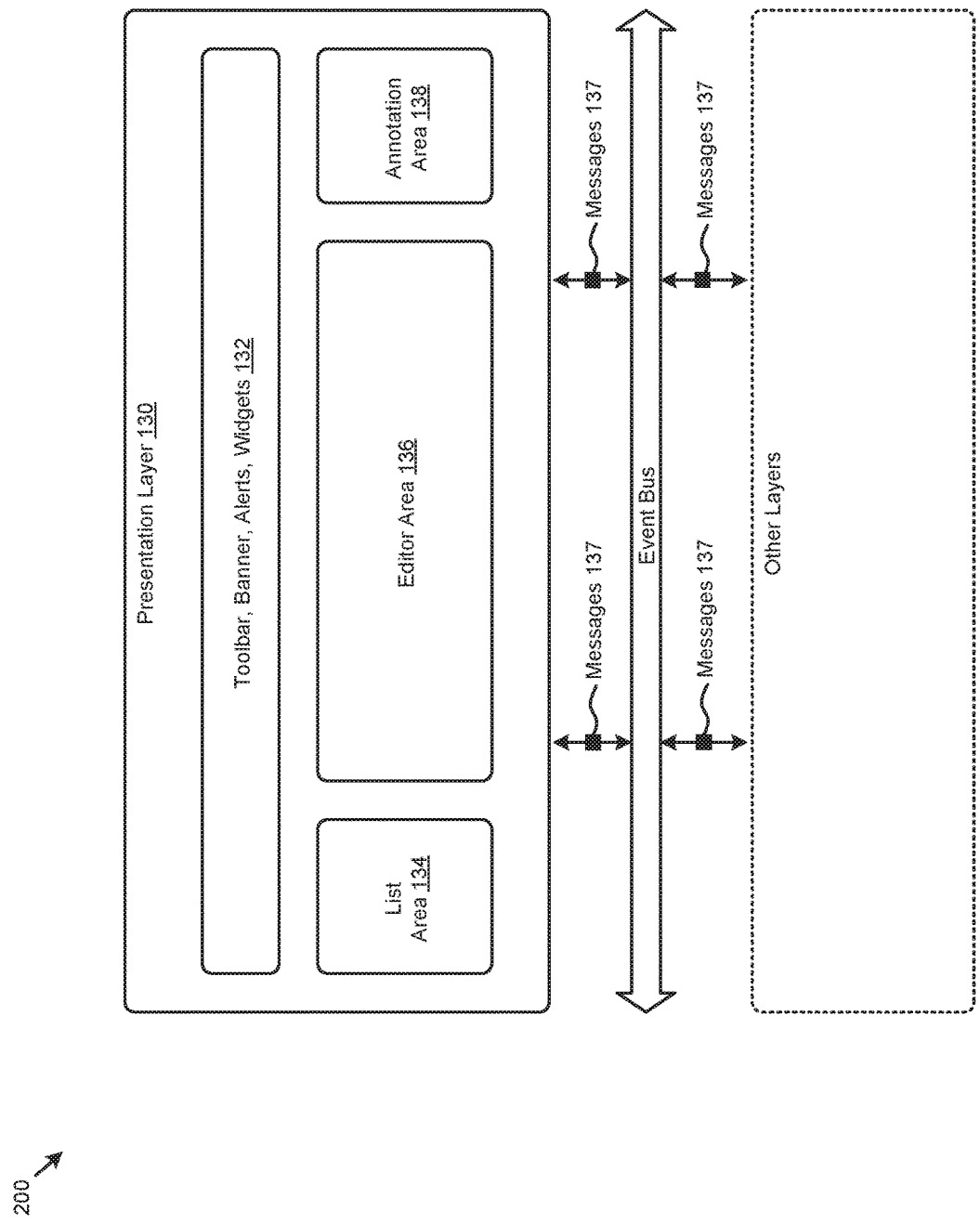
FIG. 2 presents a presentation layer partitioning as used to implement collaborative cloud-based document editing from a browser or from a browser-enabled platform native application, according to an embodiment.

FIG. 2 presents a presentation layer partitioning 200 as used to implement collaborative cloud-based document editing from a browser or from a browser-enabled platform native application. As an option, one or more variations of presentation layer partitioning 200 or any aspect thereof may be implemented in the context of the architecture and functionality of the embodiments described herein. The presentation layer partitioning 200 or any aspect thereof may be implemented in any environment.

The presentation layer 130 manages widgets 132 as well as areas that are dedicated areas or dynamically allocated areas (e.g., list area 134, editor area 136, annotation area 138, etc.) that are displayed during periods of active document editing. The same HTML/JS/CSS as used for deployment in a standalone browser-native presentation layer in a web application is used for the presentation in the embedded browser when deployed in a platform native application setting. As such one web application development effort serves both deployments.

In this and other embodiments, the collaborative editing application does not have any dependency on the network so as to launch and display its first view (e.g., the collaborative editing application can launch and display its first view when the user device is offline). To facilitate fast launching and display of an initial view, a set of assets such as page .html, outer_bundle.js, etc. are packaged with the application. Such assets are included with the downloadable web application code base at build time. Additional assets can be pushed to clients asynchronously.

Messages 137 are exchanged between the presentation layer 130 and other layers, possibly through the event bus (as shown) and/or using facilities of the embedded browser 106. Additionally or alternatively, messages might be communicated between modules via subroutine calls or API calls.

Figure 3:
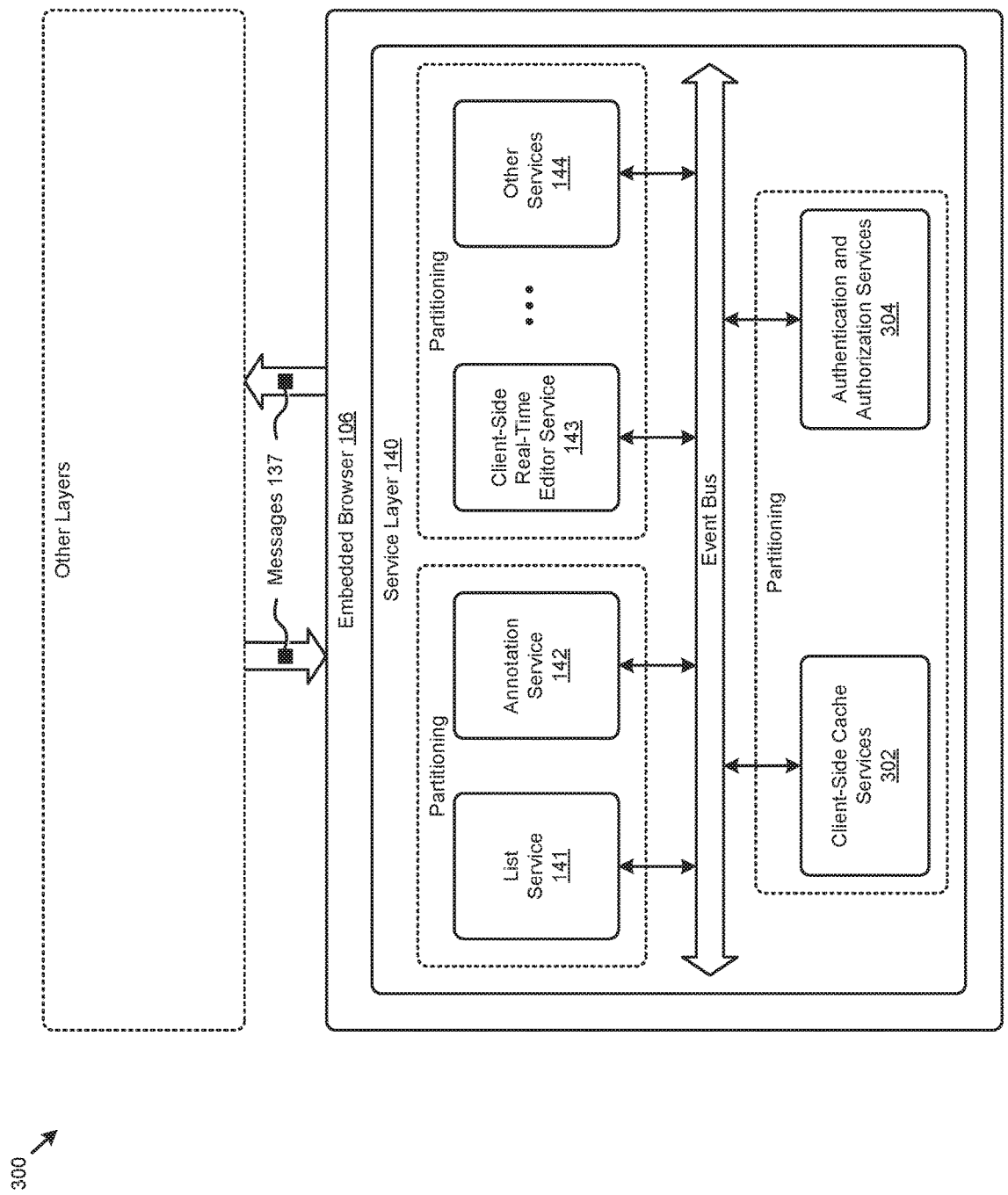
FIG. 3 presents an example of a service layer partitioning as used to implement collaborative cloud-based document editing from a browser or from a browser-enabled platform native application, according to an embodiment.

FIG. 3 presents an example of a service layer partitioning 300 as used to implement collaborative cloud-based document editing from a browser or from a browser-enabled platform native application. As an option, one or more variations of service layer partitioning 300 or any aspect thereof may be implemented in the context of the architecture and functionality of the embodiments described herein. The service layer partitioning 300 or any aspect thereof may be implemented in any environment.

Service Layer

The service layer 140 of the collaborative editing application exposes the same interface as the service layer in other web applications, hence the code base of the service layer can be shared between deployments. The service layer receives requests and responds as follows: (1) authenticate (e.g., via the authentication and authorization services 304), (2) invoke operational components within the service layer to initiate requests to the remote server to acquire any requested data, and (3) invoke other operational components within the service layer issue (e.g., list service 141, annotation service 142, client-side real-time editor service 143, other services 144, etc.) to process the requests. In some cases the service layer queries to the local application cache to access the most recent cached response for the request and returns it to the caller. As needed the service layer updates the local application cache. In some cases the service layer broadcasts responses from the remote server. The remote server may be a cloud-based shared content storage system or, in some cases, the remote server is any server/repository accessible over a network.

The client-side real-time editor service 143 supports both online regimes and offline regimes. Moreover the client-side real-time editor service 143 supports modes where caching is either in an enabled state or in a disabled state. Caching can be enabled or disabled under user control, or can be enabled or disabled programmatically. Operations of the client-side real-time editor service 143 and their relationship to operations of the client-side cache services 302 are shown and described infra.

Cached/Refresh Callback Mechanism

Some embodiments of the service layer implement callback mechanisms such as a "cached callback" and a "refresh callback". Upon incoming requests, the service layer issues two parallel requests: a request to the application cache to fetch any cached data, and a request to a remote server (e.g., to the content server or application server) to fetch the most refreshed data. These requests call their respective callback independently. The caller of the service layer can expect both the cached callback and the refresh callback to be called.

Updating the Cache

The service layer internally updates the cache with the latest data received from the server before executing the refresh callback. As such, the next time an access request is made, the freshest data is returned in the return block of the cached callback.

Order of Callbacks

In some cases, the refresh callback is called with fresh data before the cached callback completes. When this happens, the presentation layer ignores the stale data returned in the cached callback.

Permission Errors

If the refresh callback returns an error that indicates the user has lost permission (e.g., authentication and/or authorization) to access the requested resource, then the service layer evicts the cache entry for that resource and calls the refresh callback with a NO PERMISSION error code. Subsequently, the presentation layer clears the rendered UI for the requested resource and may optionally display a message to the user.

Online/Offline Caching Regimes

Table 1 depicts operations that are triggered under various online/offline caching regimes.

TABLE 1

| Regime | Description |
| --- | --- |
| Regime #1 Operations (Cache Enabled = Yes, Network = Online) | The "cached callback" is called with the cached data. A presentation layer may choose to display the cached data and inform the user that there is more data coming. Refresh callback is called with the remote data. A presentation layer may replace the rendered cache data, or prompt the user to refresh to see the latest version. |
| Regime #2 Operations (Cache = Yes, Network = Offline): | The "refresh callback" is called with a NO_NETWORK error code. The cached callback is called with the cached data. The refresh callback is called before the cached callback. |
| Regime #3 Operations (Cache = No, Network = Online): | The cached callback is called with NO_CACHED_DATA error code. Refresh callback is called with remote data. |
| Regime #4 Operations (Cache = No, Network = Offline): | The refresh callback is called with NO_NETWORK error code. The cached callback is called with NO_CACHED_DATA error code. |

Figure 4A:
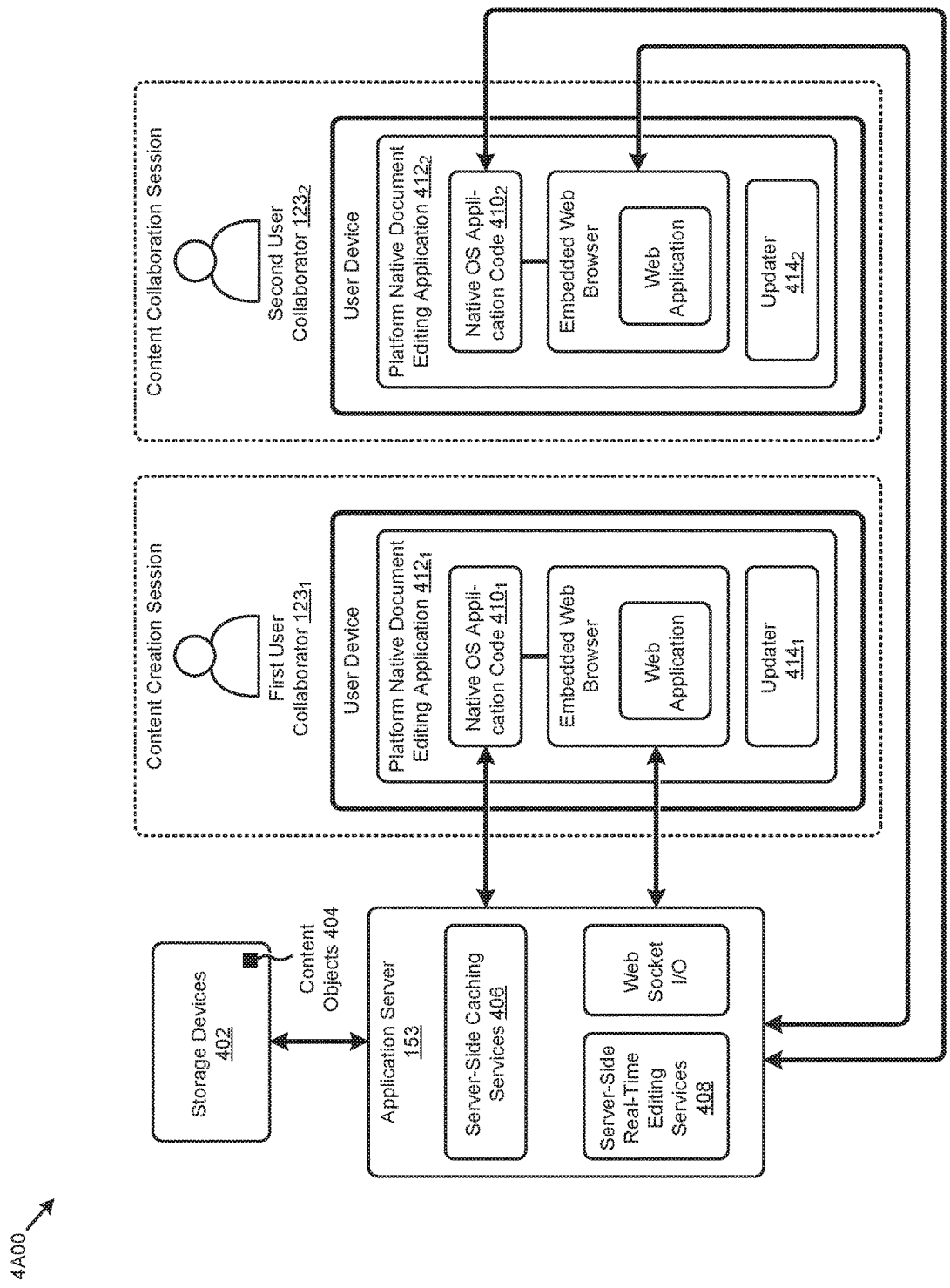
FIG. 4A presents a multi-user collaboration scenario in an environment that supports collaborative cloud-based document editing from a browser or from a browser-enabled platform native application, according to an embodiment.

FIG. 4A presents a multi-user collaboration scenario 4A00 in an environment that supports collaborative cloud-based document editing from browser-enabled platform native document editing applications (e.g., platform native document editing application $412_1$, platform native document editing application $412_2$). The browser-enabled platform native document editing applications include platform native application code (e.g., native OS application code) as well as all or portions of an embedded browser (as shown). Access by the browser-enabled platform native document editing applications to platform native code facilitates used of the non-browser socket connection 187 to perform collaboration activities on a document even when the web application in the embedded web browser is not active in the browser, and/or even when the user navigates away from the document.

In some cases, storage of certain objects (e.g., objects that are subject to high-frequency read/write operations) is handled using local storage devices that are directly attached to the application server. As shown, storage devices 402 include instances of content objects 404. Content objects can be any file or object or link or database entry. In the specific case of documents supported by the collaborative editing application 108, for each document, the following data structure is stored in a file system and/or database, and is accessed by a unique ID. Any object stored in one or more of the storage devices 402 can be written to (or read from) a collaboration server and/or a content server. The shown juxtaposition of storage devices 402 as being attached directly to the application server 153 facilitates use of low-latency directly attached instances of storage devices 402 as server-local caches. Table 2 presents one possible implementation of the server-side caching services 406, its corresponding access to data structures and/or their functions pertaining to management of certain objects (e.g., objects that are subject to high-frequency changes, change sets, or other read/write operations). The field names, data types and descriptions are merely examples.

be comprised of, for example, the ten most recently edited documents, or it might be the documents that are marked as "favorites", etc.

Given a subset of documents to keep fresh, the collaborative editing application periodically asks the application server if there are any updates for these documents, and stores the updated document data in the document storage areas. The cache can be accessed by either or both of the platform native document editing application as well as an inactive document updater. When a user begins editing a document, locally cached data is loaded into that user's device editor. Meanwhile, any stale sockets are re-established and even fresher data is retrieved from the application server 153. In some cases, the platform native document editing application accesses local resources (e.g., device-local storage resources and/or software resources) via calls to native operating system code (e.g., native operating system application code $410_1$, native operating system application code $410_2$).

TABLE 2

| Field Name | Data Type | Description |
| --- | --- | --- |
| server_changes | string[ ] | An array of change sets, "changesets" that collectively represent the full document at revision last_known_server_rev. These changes have been accepted and committed by the application server. It is not important what revision number individual elements in the array represent. When all changesets in the array are merged on top of each other, in order, starting from first changeset, the resulting document from the merged changesets represents the document at revision last_known_server_rev. |
| client_change | string | A single changeset representing the change that is accepted by the client and committed to the cache, but hasn't been accepted by and committed to the application server yet. This single changeset is distinct from the provisional change that lives in editor memory. |
| last_known_server_rev | int | The revision number associated with server_changes. Used as the base revision when committing client_change. |

Strictly as an implementation example of server-side caching services 406, the interfaces to the server-side caching services can include methods, parameters and return values as given in Table 3.

Updater modules (e.g., updater $414_1$ and updater $414_2$) provide mechanisms for populating various device-local storage repositories with the latest known document data so documents can be loaded into the client-side editor while

TABLE 3

| Interface of document cache service | | | |
| --- | --- | --- | --- |
| Method | Parameters | Returns | Comments |
| get_document | file_id: string | client_change: string<br>server_changes: string[ ]<br>last_known_server_rev: int | Return a requested document |
| get_client_change | file_id: string | client_change: string | Request changes |
| set_client_change | file_id: string<br>client_change: string | — | Record changes |
| add_server_change | file_id: string<br>server_change: string<br>last_known_server_rev: int | — | Indicate addition of a server change |
| set_server_change | file_id: string<br>server_change: string<br>last_known_server_rev: int | — | Used when the client compacts multiple server changes into one change |

FIG. 4A also depicts server-side real-time editing services 408. The collaborative editing application keeps a subset of the user's documents up to date and fresh even when the user is not actively editing them. For example, the subset might incurring a minimum of network latency. Strictly as an example implementation, the updater $414_1$ can access the server for changes as shown in Table 4.

TABLE 4

Application server endpoints used for updater operations in inactive modes

| Endpoint Call | Description |
| --- | --- |
| GET <params> | Requests the changes since <base_rev> for the given file_id. The application server compacts the changes to since <base_rev> into a single changeset and responds with the compacted changeset and the latest revision number <new_base_rev>. |
| PUT <params> | Submits the given changeset on top of <base_rev> for the given file_id. This endpoint is called when there is a pending client change in the document store that hasn't been submitted to the server yet. In some cases, the change was authored while the client was offline. When a network becomes again available, before making a GET/changeset call, the local changes are flushed to the server via this endpoint call. The return value of this call is a changeset that can be applied on top of revision <base_rev> to bring it up to revision <new_base_rev>. |

Figure 4B:
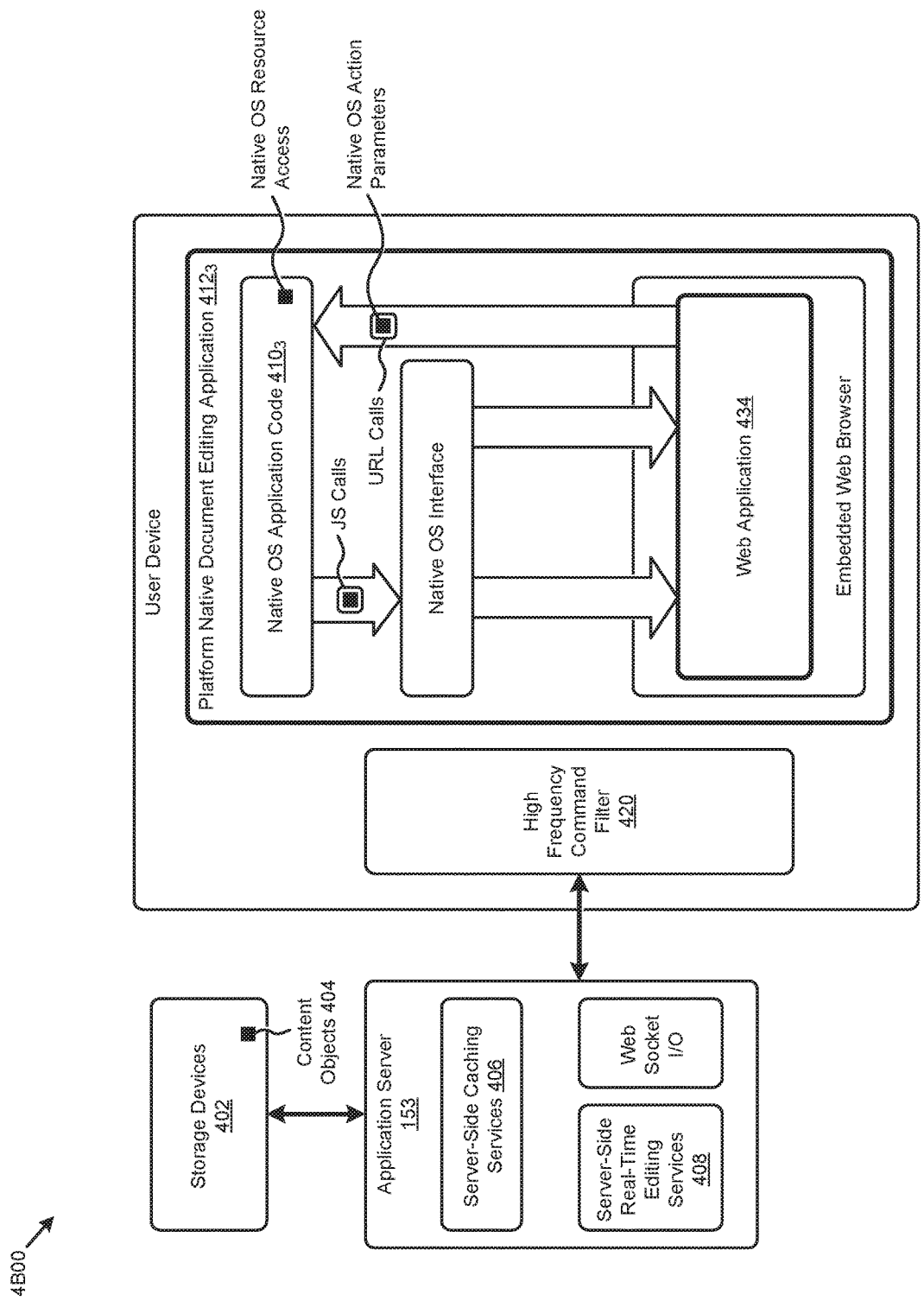
FIG. 4B illustrates use of a high frequency command filter as used in collaboration scenarios that involve collaborative cloud-based document editing, according to an embodiment.

FIG. 4B includes a high frequency command filter as used in collaboration scenarios 4B00 that involve collaborative cloud-based document editing. As an option, one or more variations of collaboration scenarios 4B00 or any aspect thereof may be implemented in the context of the architecture and functionality of the embodiments described herein. The collaboration scenarios 4B00 or any aspect thereof may be implemented in any environment.

As shown, the high frequency command filter 420 operates as a shim between the application server 153 and platform native document editing application $412_3$ within a user device. The high frequency command filter 420 serves to process document requests and/or commands from the platform native document editing application and attempt to satisfy the requests and/or commands using local resources such a cached data and/or local variables that may be current to a quantifiable degree (e.g., current and up-to-date within the second, current and up-to-date within the minute, etc.) In many cases this improves the user experience at least inasmuch as, in many cases, local requests can be satisfied without incurring user-perceived network latency. Strictly as one example, a user might make changes to a document (e.g., by typing) that can be reflected as a line of text change (e.g., 80 characters or more). Rather than sending each change (e.g., each character) one-by-one, the high frequency command filter 420 may accumulate a packet of changes (e.g., a certain number of characters) or may accumulate changes or characters for a certain time duration (e.g., a second, or a few hundred milliseconds. When the certain number of changes or characters has been met or exceed, or when the certain time duration has been met or exceeded, then the thus far accumulated changes or characters are sent (e.g., in one communication packet).

The embodiment shown in FIG. 4B is merely one example where a corpus of native OS application code $410_3$ can be used to implement collaborative cloud-based document editing. Examples of native OS application code $410_3$ include word processing editors on an Apple Macintosh computer, and/or word processing editors on a Microsoft Windows PC, or on an iOS device, etc.

Further details regarding general approaches to implementing a device-independent content editor are described in U.S. application Ser. No. 14/952,601 titled, "CREATING SHARED CONTENT IN A DEVICE-INDEPENDENT CONTENT EDITOR USING A NATIVE OPERATING SYSTEM INTERFACE" filed on Nov. 25, 2015, which is hereby incorporated by reference in its entirety.

Figure 4C:
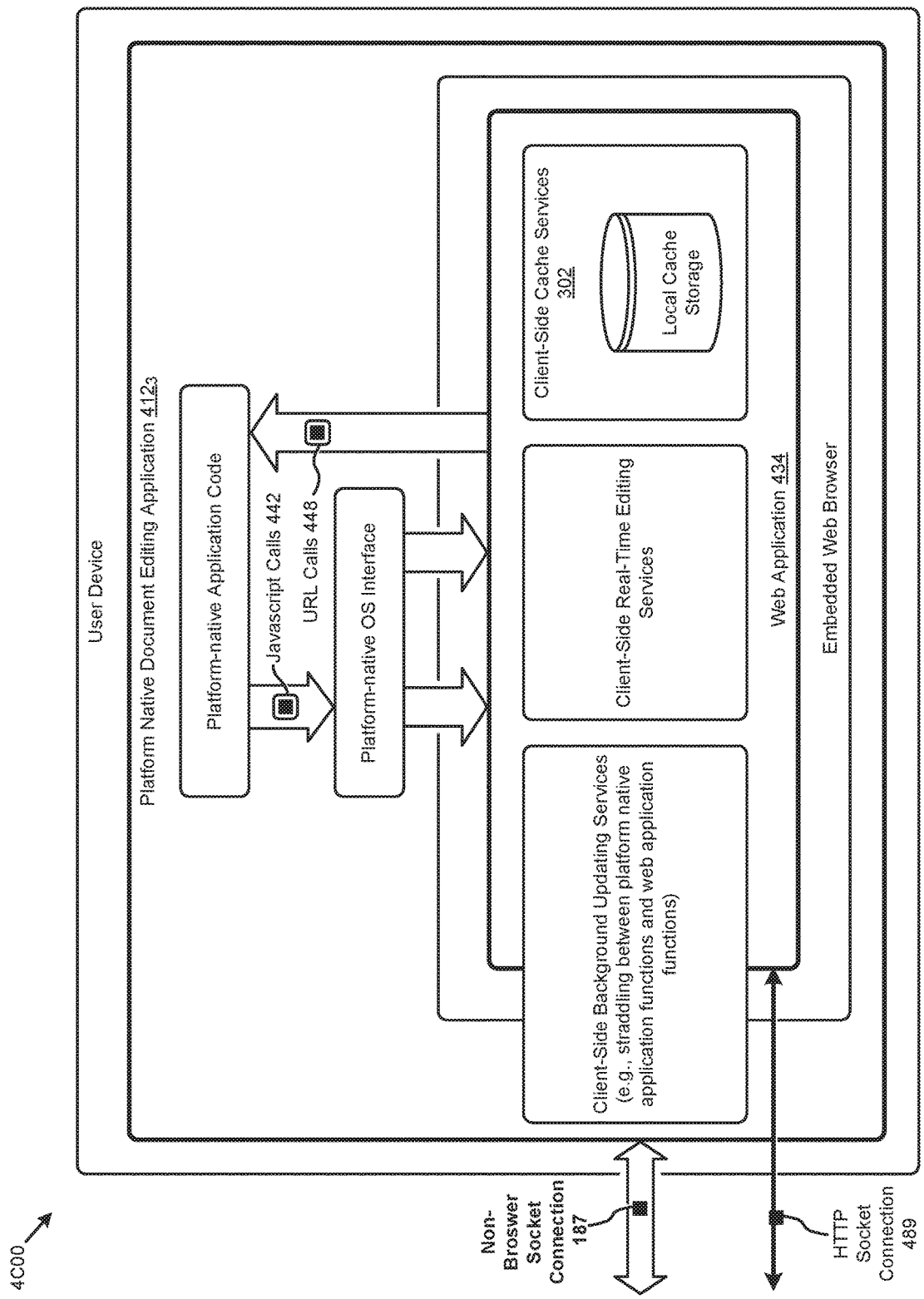
FIG. 4C depicts a set of client-side real-time editing services that are employed for collaborative cloud-based document editing from a browser or from a browser-enabled platform native application, according to an embodiment.

FIG. 4C includes a set of client-side real-time editing services 4C00 that are employed for collaborative cloud-based document editing from a browser or from a browser-enabled platform native application. As an option, one or more variations of client-side real-time editing services 4C00 or any aspect thereof may be implemented in the context of the architecture and functionality of the embodiments described herein. The client-side real-time editing services 4C00 or any aspect thereof may be implemented in any environment.

As shown, a platform native document editing application $412_3$ include communication mechanisms (e.g., via Javascript calls 442 and/or URL calls 448) between web application 434 and native components within the platform native document editing application. Specifically, the web application can use any portions of the shown platform-native operating system interface and or any platform-native application code.

Additionally, the web application supports two different socket connections for communication with a server. These two different socket connections support user sessions and socket sessions, each of which have different uses and implementations. Strictly as examples, the HTTP socket connection 489 might be opened by the embedded web browser to create and/or delete comments or other annotations pertaining to the document, while the persistent, non-browser socket connection 187 is opened by the platform native application and is used for sending and receiving changes to the document (e.g., via operational transforms). As shown, some portions of the client-side background updating services are desktop-resident functions and some portions of the client-side background updating services are resident in the web application.

Additional example uses and implementations of socket sessions are presented in Table 5.

TABLE 5

| User Session | Socket Session |
| --- | --- |
| One per browser session (e.g., multiple Chrome tabs can share the same session) | One per socket, i.e., one per open document; can have multiple socket sessions per user |
| State is stored in a high-performance database | State is stored in-memory on the server that owns the socket |
| Session ID stored in cookie | Not stored in cookie; a stateful connection between client and server maintained; initial handshake uses user session ID in cookie to create and cache a client information on the server side of the socket |

When a client communicates with a server, it can use any form of sockets, singly or in combination. Using various possible configurations of sockets, a client-server interaction protocol can be carried out as pertains to the following FIG. 5

Figure 5:
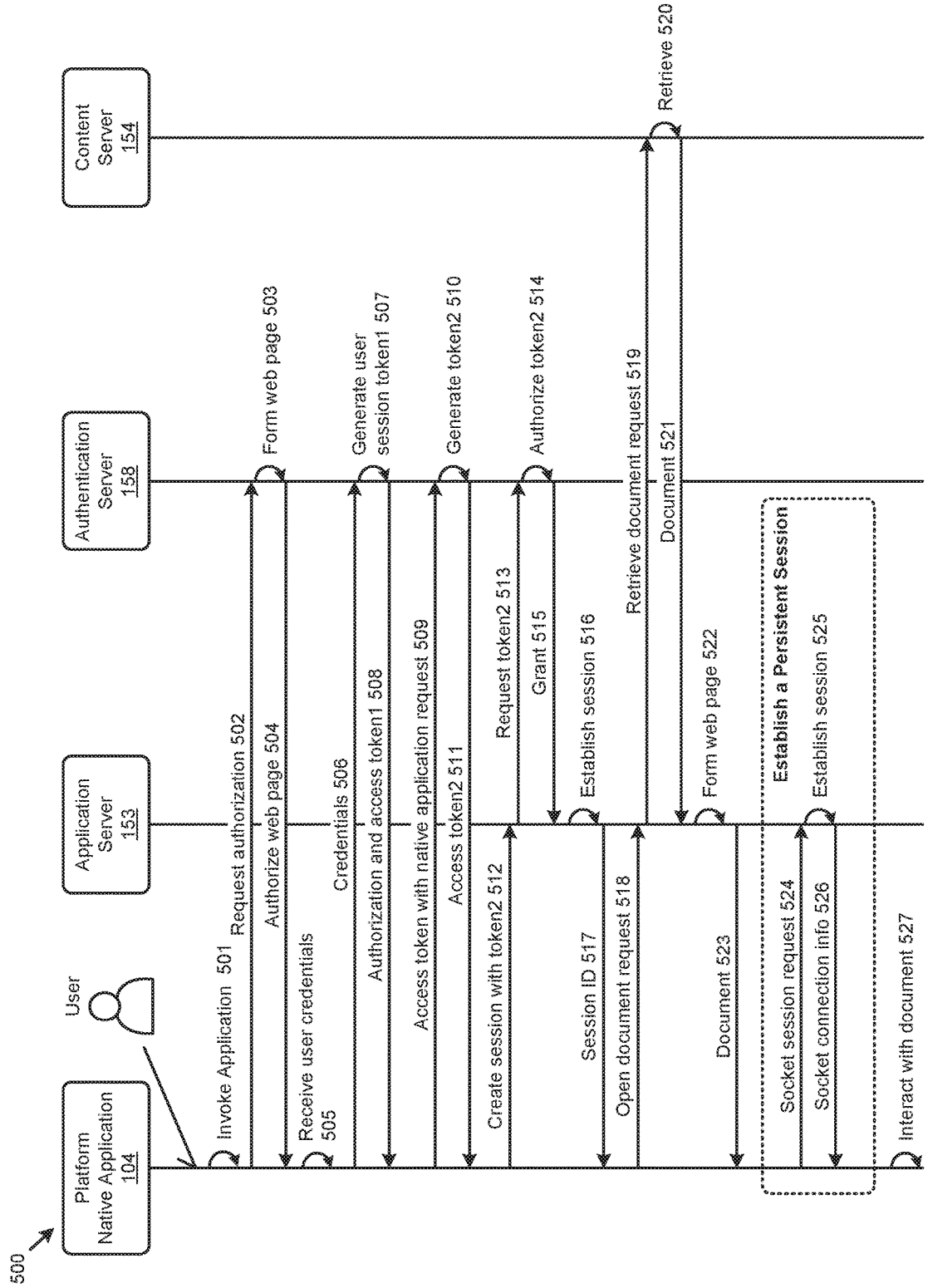
FIG. 5 presents a client-server interaction protocol that is employed for authentication and real-time document collaboration in systems that support collaborative cloud-based document editing from a browser or from a browser-enabled platform native application, according to an embodiment.

FIG. 5 presents a client-server interaction protocol 500 that is employed for authentication and real-time document collaboration in systems that support collaborative cloud-based document editing from a browser or from a browser-enabled platform native application. As an option, one or more variations of client-server interaction protocol 500 or any aspect thereof may be implemented in the context of the architecture and functionality of the embodiments described herein. The client-server interaction protocol 500 or any aspect thereof may be implemented in any environment.

Authorization

There are several services that the collaborative editing application makes authorized requests to. As examples, the platform native application 104 makes authorized requests to the content server and/or to the application server. As earlier discussed, exemplary systems use at least two mechanisms for carrying out request protocols to/from an application server: (1) over a persistent non-HTTP socket connection, and/or (2) over an HTTP socket (e.g., in an Ajax data exchange).

Authorizing with the Content Server

The content server authorization in the collaborative editing application uses any known technique for achieving an authorization grant. Strictly as one authorization protocol example, on a first launch of the platform native application, a window or popup that invokes communications with the authentication server 158 is displayed to the user. The user enters a username and password combination or other credential to log in. The window or popup then prompts the user to allow access to the collaborative editing platform native application. Once the user allows access, the window or popup redirects to a URL that contains an authorization short-lived code. The collaborative editing application intercepts this URL and calls another endpoint to exchange the authorization code for an access token and a refresh token. These tokens are saved in a database for future communications with the content server. Each request to the content server will contain the access token.

In the collaborative editing web application, a user session is initially created on the first HTTP request. The session is empty at this point, however, a session ID is established and stored in the cookie (e.g., with a name such as "express sid") and returned to the client. When the socket.io connection is created, the server performs bookkeeping during the handshake phase and saves the express sid into the socket session that it maintains with the client. When the client sends a CLIENT READY message, the server uses an authorization code in the message to obtain access/refresh tokens from the content server, stores the tokens in the user session, and associates a client object that uses those tokens with the socket.

Authorizing with the Application Server and Sessions

The collaborative editing application exchanges the user's access token to serve as an authorization code for the collaborative editing service. The authorization code is passed to the application server via an HTTP endpoint (e.g., "createSession*"). The server creates the requested session, exchanges the authorization code for an access/refresh token pair, stores the tokens in the session, and returns the session ID back to the collaborative editing application. The collaborative editing application stores this session ID and includes it in further communications with the application server. From the server's point of view, this session is a session that has a time to live (TTL) of 60 days. The server stores access/refresh tokens.

In some cases, a new "createSession" endpoint is generated when launching the collaborative editing application. The default first view of the collaborative editing application is a list of documents deemed to be accessible while still observing the user's authentication and authorization status.

For socket connections, the collaborative editing application includes the session ID as a cookie header in the connection request. The application server processes this session ID to authorize the socket messages.

For HTTP requests, the application server can use the session ID to obtain access/refresh tokens. For HTTP requests that eventually call to the content server to perform a task, authorization is implicit. For HTTP requests that don't call the content server, the application server uses the access/refresh token to authorize the user first, and then fulfills the request. For example, HTTP requests used by the inactive document updater fall into this category as they don't call to the content server, but need to be authorized with the content server. These HTTP requests are not issued at high frequencies, so authorizing every request with the content server can be performed without incurring user-detectable network latency.

The diagram of FIG. 5 shows the calls that the collaborative editing application makes so as to retrieve tokens for itself, and so as to authorize the application server 153 to make calls on behalf of the user. It also shows how the session ID is established between the collaborative editing application and the application server.

In the specific embodiment of client-server interaction protocol 500, the user invokes the platform native application (operation 501), at which time the platform native application 104 requests authorization for the user (message 502). The authorization server responds by forming a web page or popup (operation 503) which is sent to the platform native application (message 504) for consideration by the user. The user enters user credentials (operation 505) which are sent to the authorization server (message 506), whereupon the authorization server generates a user session token, namely the shown "token1" (operation 507), which is then delivered to the requestor (message 508). The user is now authenticated.

Once authenticated, the platform native application on behalf of the user requests access to some document (message 509). Upon receipt of the request, the authorization server generates another token, in this case "token2" (operation 510) which is delivered to the requestor (message 511). A grant of a token such as "token2" is a component of a request to create a session (message 512), which is received by the authorization server, either via relay (message 513) or directly. Using any known technique, the authorization server validates the provided "token2" (message 514) and provides a grant (message 515) to the requestor. Upon receipt of the grant, the application server 153 establishes the requested session (operation 516) and delivers the session ID (message 517) to the platform native application. The platform native application has sufficient resources to form a grantable request to open a document (message 518). The application server issues a retrieve document request (message 519), which is satisfied by the content server 154 (operation 520). Specifically, the requested and retrieved document is sent back to the application server (message 521). As shown, the application server forms a web page (operation 522) then delivers the web page and the requested document (operation 523) to the platform native application.

The web page at the platform native application in combination with some portions of the document, either at the platform native application or at the application server subsumes enough functionality that the user can edit the document via the web page. Next, as shown, a persistent session for sending edit stream representations to the application server is established (message 524, operation 525, and message 526). The user, through the platform native application, interacts with the document (operation 527). Edits from user interaction with the document are passed to the application server as a stream of operational transforms. As such, modifications to the document can be applied whenever a platform is online, regardless of whether or not the user of the platform is actively viewing or manipulating the shared document.

Example Protocol Exchange

In this example, the collaborative editing web application requests a document from the application server via HTTP. Requesting a document might include fetching comments on the file, creating a shared link, proxying image downloads, etc. Any or all of these requests can be fulfilled by making a call to the content server, retrieving some data, processing said data, and returning the data back to the client. The application server translates the user's web session to a content server access token (via session state lookup) and calls the content server on behalf of the user. In some embodiments, the client-side collaborative editing application, operates within an access paradigm where, once authorized, the client is configured to make calls to the content server directly (e.g., without requiring services of the application server). For example, the collaborative editing application can autonomously retrieve comments from the content server—without requiring a protocol exchange or other involvement from the application server.

The protocol of FIG. 5 can be extended to support interactions with a cache service. Such a cache service can provide data related to the attributed textual content of any documents that are derived from the document or other objects. Such a document cache service provides access to document data using HTTP—without the need for a persistent socket connection. This capability is used for keeping inactive documents up to date. Inactive documents are ones that the client is not actively viewing or editing, but is still receiving periodic updates for. In certain situations, the HTTP endpoints are used for the offline-capable desktop and mobile applications. Some such situations include situations when server resources are limited (e.g., such that steps can be taken to avoid an explosion in the number of active socket connections), and situations when the presence of a user on a document is confirmed by an active socket.

Figure 6A:
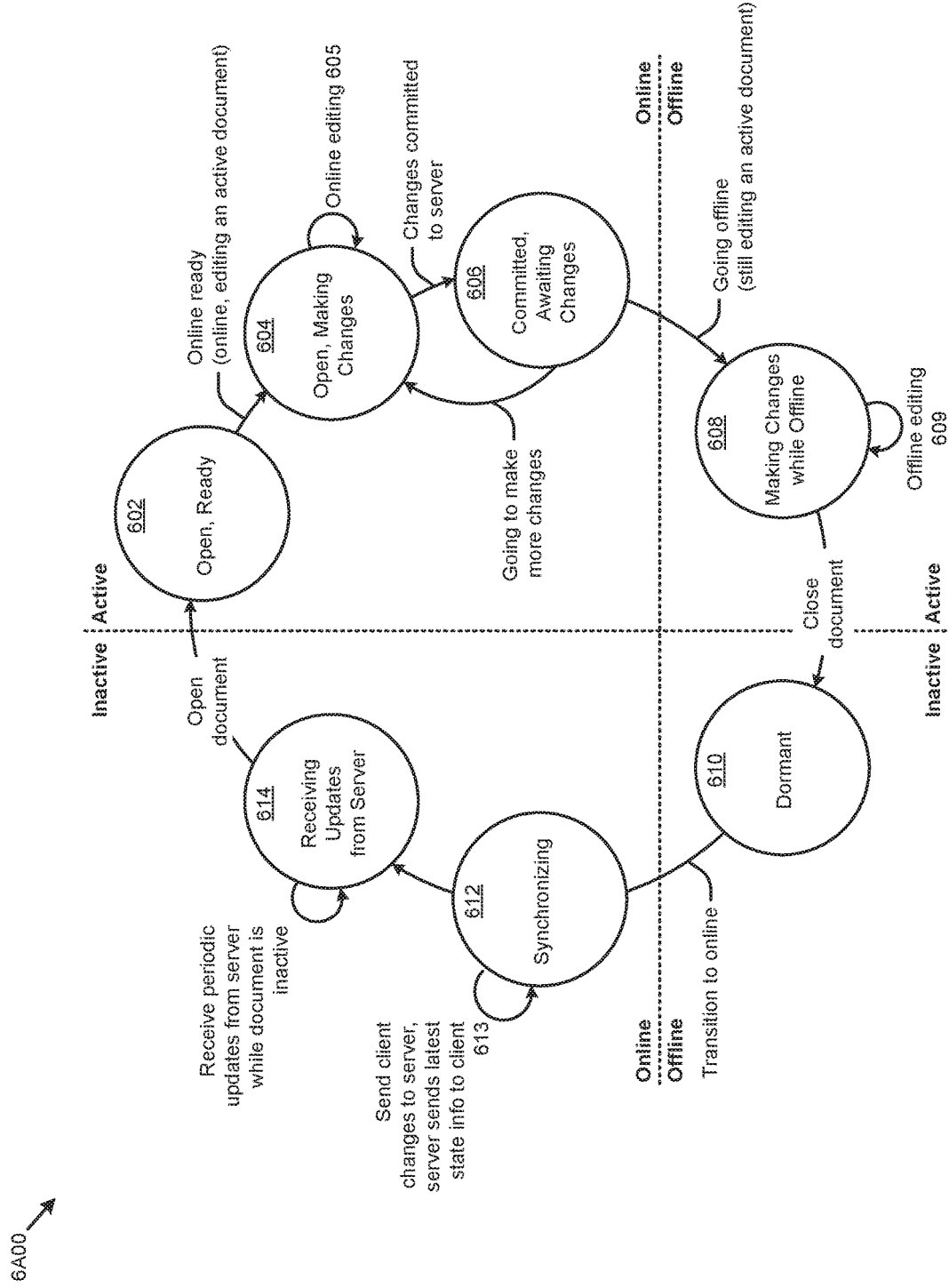
FIG. 6A presents a series of state transitions that are employed for managing operational transformation transactions while performing collaborative cloud-based document editing from a browser or from a browser-enabled platform native application, according to an embodiment.

FIG. 6A presents a series of state transitions 6A00 in a state machine that are employed for managing operational transformation transactions while performing collaborative cloud-based document editing from a browser or from a browser-enabled platform native application. As an option, one or more variations of state transitions 6A00 or any aspect thereof may be implemented in the context of the architecture and functionality of the embodiments described herein. The state transitions 6A00 or any aspect thereof may be implemented in any environment.

As shown the state transitions are presented in four categories pertaining to the possibilities of being online (or offline) or of being active (or inactive). The shown states include state transitions from an active-online state (e.g., including state 602, state 604, and state 606), to an active-offline state (e.g., including state 608), to an inactive-offline state (e.g., including state 610), and to an inactive-online state (e.g., including state 612 and state 614).

These states are observed for purposes of reducing bandwidth usage as well as for reducing CPU utilization. The shown state diagram is backed by specialized data structures that are designed to improve the way a computer stores and retrieves data when performing operations within the shown states as well as when transitioning between states. More specifically, and especially in the context of mobile applications, lowering demands for bandwidth by reducing network traffic (e.g., when active) and/or eliminating network traffic (e.g., when inactive) serves to achieve much sought-after network I/O (input/output or IO) reduction as well as CPU use reductions and other resource reductions.

Real-Time Document Editor

The platform native application communicates with the application server through the real-time editor service. The communication happens over socket.io that uses a web socket. This real-time communication serves to keep the document in sync between the server and the multiple clients connected to it, all while any number of clients asynchronously edit the document.

Changes to documents made by users or agents can be managed by a state machine. The state chart of FIG. 6A depicts states and transitions to other states based on the nature of a detected event. The state chart is depicted with reference to the shown quadrants composed of the shown Inactive/Active regimes and the shown Offline/Online regimes.

State 602 is shown in the active-online quadrant. The state representation conditions where a document is open and ready for editing. Upon making changes, the state machine transitions to state 604, whereupon a user can perform online editing 605. When the changes are committed to the server the state machine moves to state 606, which oscillates between state 604 so long as the user is making more changes and committing them.

At some point in time, it can happen that the user device goes offline, even though the user is still actively viewing and/or editing a document. Accordingly, state 608 supports making changes wile offline. Offline editing 609 can continue so long as the user deems. Upon closing the document, a dormant state (e.g., state 610) is entered and remains in that state until a transition to being online again. Upon returning to being online, a synchronizing state (e.g., state 612) is entered, during which time the client requests and the server provides changes that had been made to the document during the earlier periods (e.g., during the period that the user device was offline). The document is synchronized and brought up-to-date with such changes at state 613. Even after the document has been synchronized and brought up-to-date with changes, and even though the user had previously closed the document (e.g., and the user is inactive with respect to the subject document), at state 614, the user device can still receive updates from the server. This state of receiving periodic updates from the server while the document is inactive can persist indefinitely. However, at some point in time, the user might again open the subject document and move again into an active-online regime.

In some cases portions of a custom or proprietary algorithm and/or a published/standard algorithm are used to achieve synchrony between multiple clients. One such published/standard algorithm is known as the operational transformation protocol (OT). In embodiments using OT, the source of truth for the document data is the server. Observance of the OT protocol keeps multiple clients in sync and establishes concurrence as to the synchronicity of a subject document.

Figure 6B:
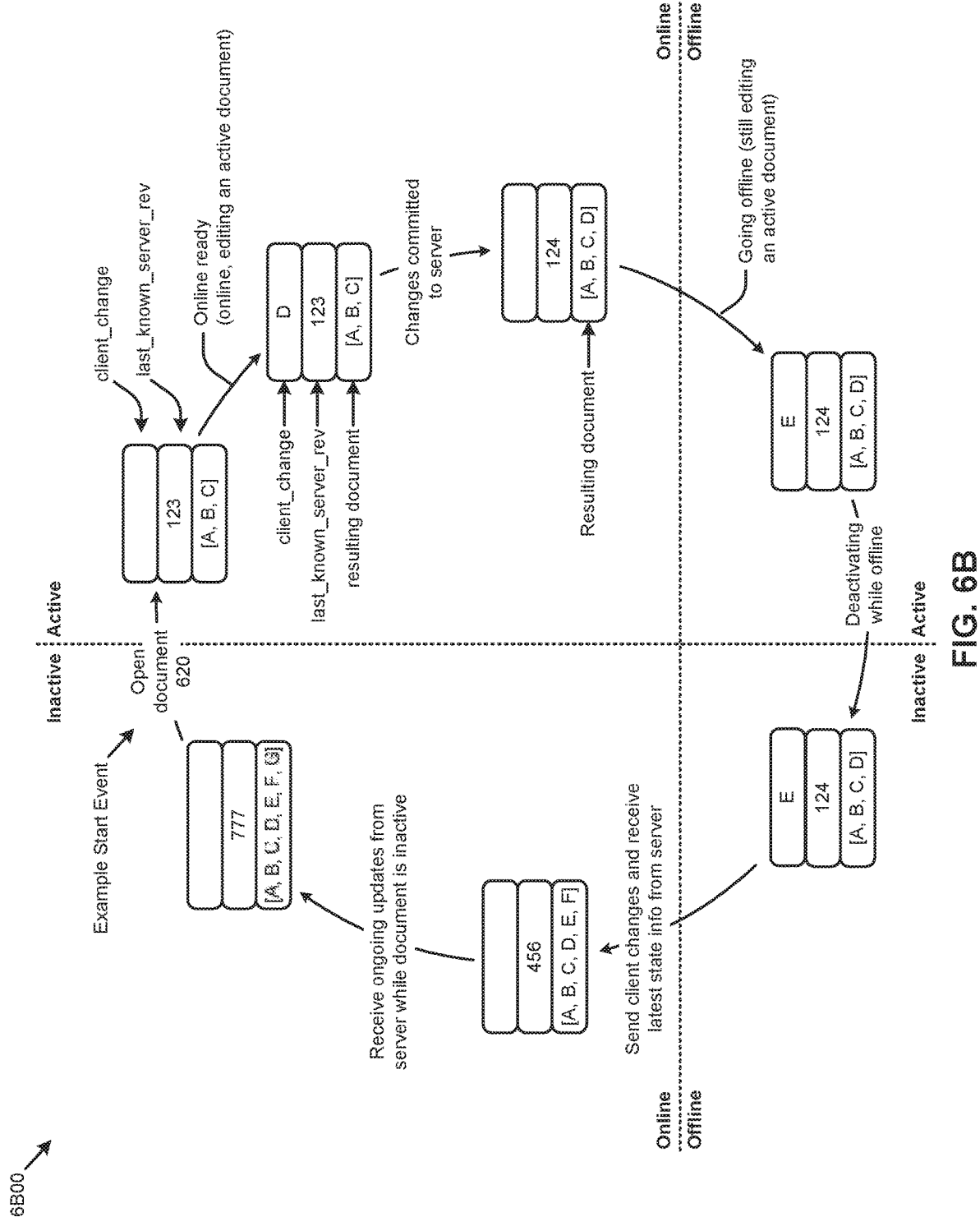
FIG. 6B presents a series of data value transitions that occur while managing operational transformation transactions while performing collaborative cloud-based document editing from a browser or from a browser-enabled platform native application, according to an embodiment.

FIG. 6B presents a series of data value transitions 6B00 that occur while managing operational transformation transactions while performing collaborative cloud-based document editing from a browser or from a browser-enabled platform native application.

The diagram shows values within a data structure as the user transitions through the four quadrants. This example begins upon an open document operation 620. At this moment in time, and as shown, the data structure comprises an empty field that is ready to be filled-in with a client change to the subject document. Additionally, the last known server revision indication is stored in the data structure. This field is used to determine where to start when applying changes made by other collaborators. The user who opened the subject document (e.g., open document operation 620) may commence to make further changes. As shown, the user adds the character "D" to the document corresponding to the last known server revision. The act of the change (e.g., adding the "D" to the document) is stored in the client change field. The shown values in the resulting document field represent the client-side state of a document (e.g., with or without client-side changes being applied). In some time periods, the client-side state of a document differs with respect to the state of that same document on the server. At some point the changes are committed to the server (e.g., by a save operation). The change of the client change field is applied to the last known server revision, and the last known server revision indication is incremented (e.g., from revision 123 to revision 124, as shown).

At this point in the example, the user goes offline. Even though the user is offline, he/she is still able to make changes to the subject document. Such changes are recorded as change sets (see Table 2). At yet another point in time, the user ceases to make changes, and the progression moves to an inactive-offline regime. The changes remain recorded at the client, however since the user device is offline, changes are merely retained until such time as the user device goes back online. Upon the transition from offline to online, the retained client changes are sent to the server. Further, any changes that were performed by other collaborators are applied to the document at the client side. There may be many such collaborators and many such changes. Accordingly, while in the inactive-online regime, the client receives updates from the server (e.g., the addition of the character "F") so as to bring the subject document into synchronicity with the server revision. In this inactive-online regime, and as shown, the last known server revision field is updated (e.g., from revision 456 through revision 777) to reflect the state of synchronicity up through revision 777. The last change from the last commit of the subject document by another collaborator is shown by adding the character "G". When last change from the last commit of the subject document by another collaborator has been accomplished, the now synchronized document can be subjected to further user editing. To do so, the user opens the document, completing the cycle.

Synchrony between multiple copies of the same shared document can be accomplished using a multi-actor protocol. Further details describing the use of custom or proprietary protocol/algorithms and/or standard protocol/algorithms that can be used to achieve synchrony between multiple clients is shown and discussed as pertains to FIG. 7.

Figure 7:
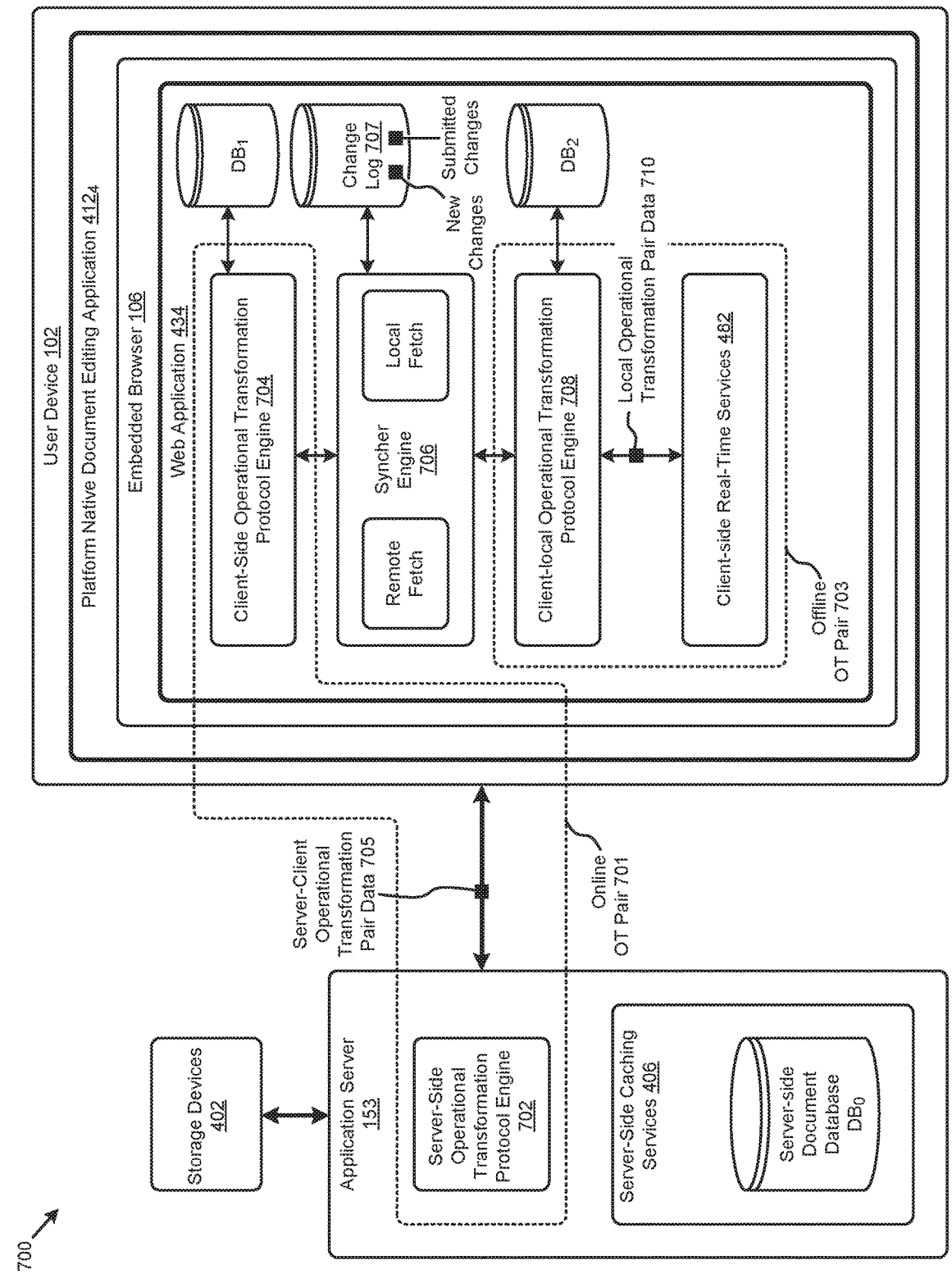
FIG. 7 presents a client-server system that is configured to implement operational transformation transactions while performing collaborative cloud-based document editing from a browser or from a browser-enabled platform native application, according to an embodiment.

FIG. 7 presents a client-server system 700 that is configured to implement operational transformation transactions while performing collaborative cloud-based document editing from a browser or from a browser-enabled platform native application. As an option, one or more variations of client-server system 700 or any aspect thereof may be implemented in the context of the architecture and functionality of the embodiments described herein. The client-server system 700 or any aspect thereof may be implemented in any environment.

A system that uses custom or proprietary algorithms and/or published/standard algorithms to achieve synchrony between multiple clients is depicted in system 700. In particular, the system 700 includes a web application 434 within a platform native document editing application $412_4$ that communicates with an application server. The system 700 support two operational transformation pairs (OT pairs). An OT pair is a pair formed of two operational units (e.g., a server and a client, or a client and another client) that operate cooperatively on a document via the OT protocol or variation thereof.

As used herein, an OT pair has the following properties: (1) Both the client and the server agree on the same source of truth for data and state. (2) The client's database is a time-shifted or time-delayed mirror of the server's database. (3) The client cannot update its document database without involvement from its server pair, rather a client must submit a document change to its server pair, and only upon acknowledgement from the server pair, can the client's data base be updated to reflect the updated document. (4) The client keeps track of new and submitted data. A "submitted" change refers to a change that has been submitted to the server but not yet acknowledged. A "new" change is a change that has not been submitted to the server yet. (5) Each OT pair keeps track of only one change at a time, and these changes are recorded in a changes log 707 (e.g., as new changes or as submitted changes). (6) Once a submitted change is acknowledged, it is merged into the database of the submitter and the change log is updated to reflect the acknowledged change submission.

To facilitate offline editing capabilities, two independently operating OT pairs are implemented: (1) The online OT pair 701, as shown, and (2) An offline OT pair 703.

The embodiment of FIG. 7 has the following features: (1) The editor and the remote server communicate over the online OT pair 701. (2) The editor is not dependent on the network since the editor communicates over the offline OT pair 703 that runs locally within the client. More specifically, the online OT pair is formed by the shown server-side operational transformation protocol engine 702 and the client-side operational transformation protocol engine 704. The online OT pair is configured to carry-out an operational transformation protocol to synchronize changes between multiple concurrently editing sharers. Changes and other data items (e.g., server-client operational transformation pair data 705) particular to the online OT pair may be stored at the application server within $DB_0$, and on a user device within $DB_1$ (as shown). Also, the offline OT pair is formed by the shown client-local operational transformation protocol engine 708 and the client-side real-time services 482. Changes and other data items particular to the offline OT pair (e.g., local operational transformation pair data 710) may be stored in the user device within $DB_2$ (as shown)

The state of the online OT pair 701 contains the remote server state. This state is saved on the file system of the application server and persists across application launches. The state of the offline OT pair 703 contains user changes made while offline. The sum total of offline changes by the offline user and online changes made by any sets of collaborators can be synchronized when the offline user goes online.

Caching Reads and Buffering Writes

Often, the state of a remote OT client changes rapidly during active collaboration. Committed changes coming from any of the collaborator causes a change to the server's last revision. To support the potentially high volume of reads and writes, a cache-and-buffer mechanism is implemented in front of the local file system of the corresponding platform. As one example, when using the cache-and-buffer mechanism on the application server (e.g., server-side caching services 406), the collaborative editing application's cache-and-buffer mechanism facilitates high-performance local I/O, even in the presence of high volume of local reads and writes. Cache management is accomplished using any known techniques.

Syncer Engine

The aforementioned two OT pairs use the OT protocol and algorithms to operate. Syncing the two OT pairs with each other is accomplished using an algorithm embodied in the syncer engine 706.

Algorithms within the syncer engine perform as follows: (1) The syncer engine initiates upon invocation. (2) The syncer engine initiation includes taking a snapshot of the local OT server and remote OT client at the moment the algorithm starts running. (3) The syncer syncs remote OT client with new changes on local OT server. (4) The syncer syncs local OT server with new changes on remote OT client. (5) The syncer perform local bookkeeping to a change log 707 to record what changes are new and what changes have been submitted.

Variations

Some embodiments include variations where all or nearly all of the application code can run in asynchronous processes. In such embodiments, parent processes launch GUI windows and manage the life cycle of the desktop session. In some such situations, such an asynchronous process includes a Node.js runtime library which library can access the file system of the platform as well as access other capabilities of the host operating system, including those capabilities and/or features that are not available to a compliant web browser. Some embodiments include variations where an agent spawns a child process from the asynchronous process, using the child_process library in the Node.js runtime library. Some embodiments include variations that limit permission checking to events only where/when there is a corresponding detected change. Some embodiments include variations that implement security questions and/or authentication challenges.

System Architecture Overview

Additional System Architecture Examples

Figure 8A:
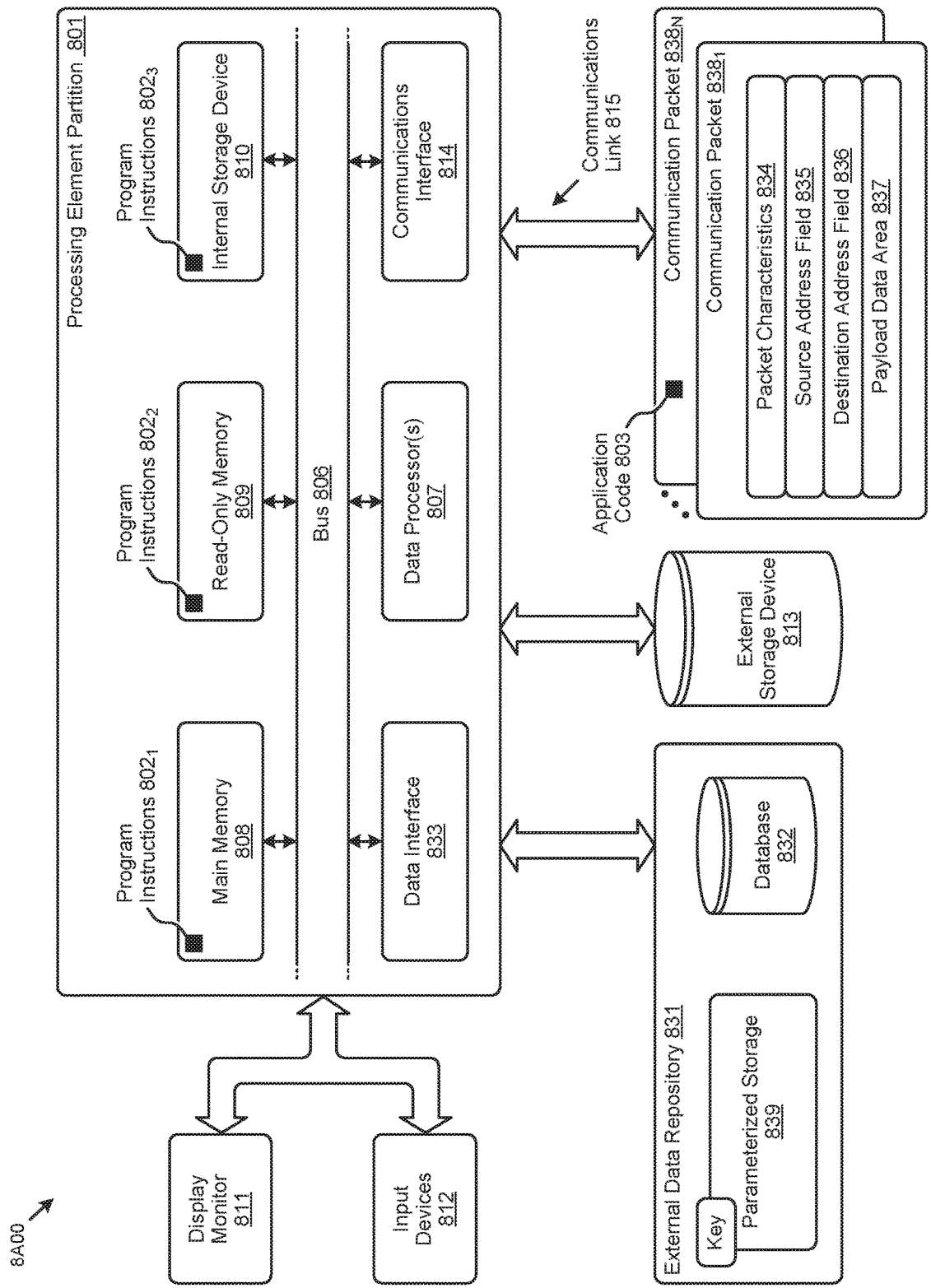
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets (e.g., communications packets $838_1$, and communications packets $838_N$) comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to collaborative cloud-based document editing from a browser-enabled platform native application. A module may include one or more state machines and/or combinational logic used to implement or facilitate the operational and/or performance characteristics pertaining to collaborative cloud-based document editing from a browser-enabled platform native application.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of collaborative cloud-based document editing from a browser-enabled platform native application). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to collaborative cloud-based document editing from a browser-enabled platform native application, and/or for improving the way data is manipulated when performing computerized operations pertaining to browser-enabled platform native application that interfaces with a cloud-based collaborative storage system.

Figure 8B:
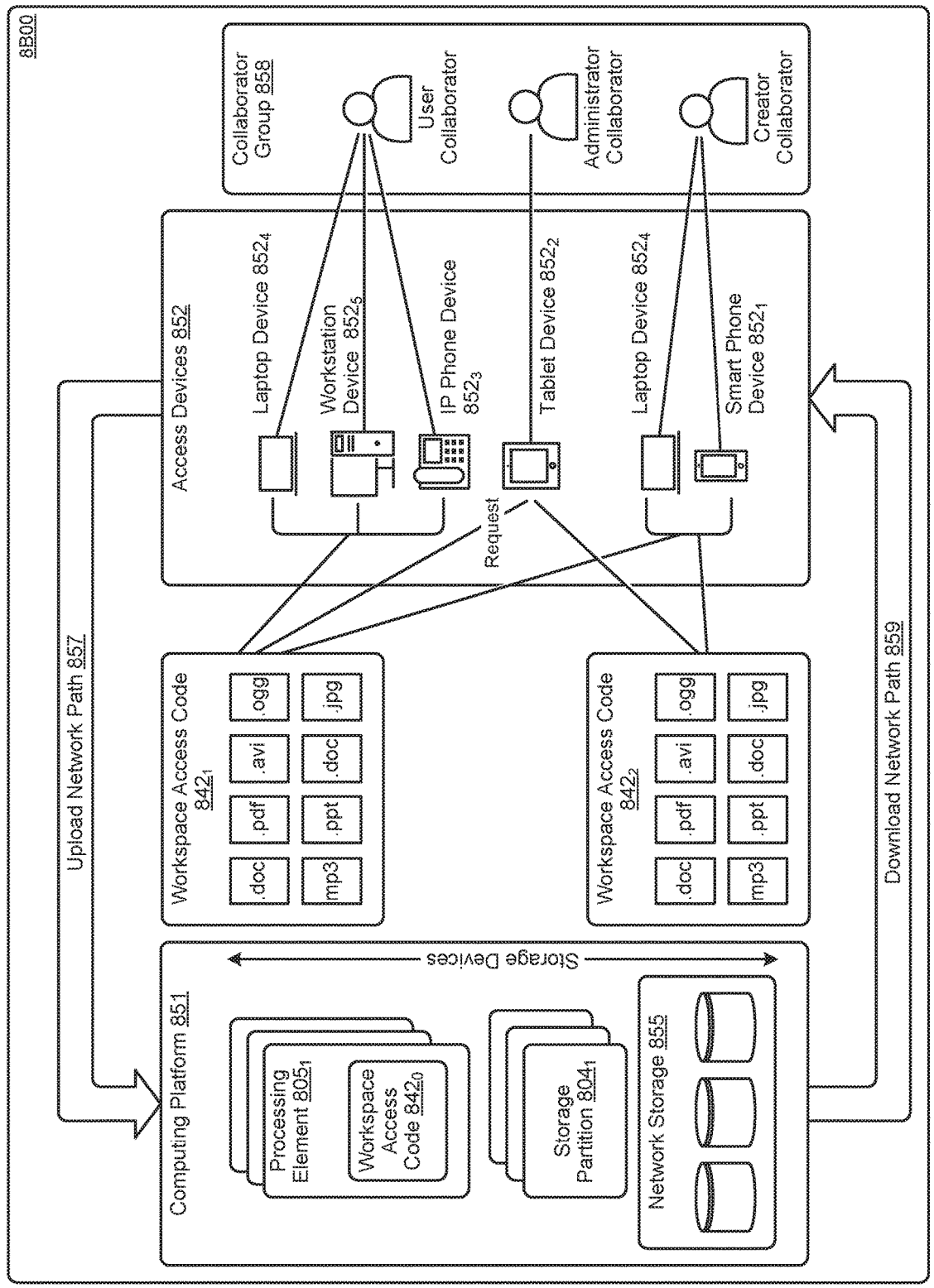

FIG. 8B depicts a block diagram of an instance of a remote cloud-based shared file facility 8B00. Such a remote cloud-based shared file facility supports access to workspaces through the execution of workspace access code (e.g., workspace access code $842_0$, workspace access code $842_1$, and workspace access code $842_2$). Workspace access code can be executed on any of the shown access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as the shown networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for collaborative editing of a cloud-based shared document using a browser-enabled platform native application, the method comprising:
prov鐘ing shared access to a document that is stored in a remote cloud-based shared file facility;
launching a platform native application from a user device of a first collaborating user;
establishing a non-browser connection between the platform native application and the remote cloud-based shared file facility, wherein the non-browser connection operates independently from a browser connection, wherein the non-browser connection is a connection over a communications protocol, and wherein the non-browser connection is an authenticated connection;
launching, by the platform native application an embedded browser that operates within the platform native application;
loading, by the embedded browser over a browser connection, a web application that executes within the embedded browser;
retrieving, from the remote cloud-based shared file facility a first user copy of the cloud-based shared document, wherein the first user copy of the cloud-based shared document is accessible by the web application; and
sending a modification of the first user copy of the cloud-based shared document to the remote cloud-based shared file facility to create a modified document that is exposed to one or more second collaborating users.

2. The method of claim 1, wherein the platform native application manages state transitions between at least two of, an active-online state, an active-offline state, an inactive-offline state or, an inactive-online state.

3. The method of claim 2, wherein the non-browser connection between the platform native application and the remote cloud-based shared file facility remains open during state transitions between at least two of, an active-online state, an active-offline state, an inactive-offline state or, an inactive-online state.

4. The method of claim 1, wherein the non-browser connection between the platform native application and the remote cloud-based shared file facility is a websocket connection over a websocket protocol.

5. The method of claim 1, further comprising:
closing the first user copy of the cloud-based shared document,
receiving, by the platform native application over the non-browser connection, at least one modification to the cloud-based shared document that originates from one of the one or more second collaborating users, and
applying the at least one modification to the first user copy before the first collaborating user reopens the first user copy of the cloud-based shared document.

6. The method of claim 1, wherein the embedded browser is formed from all or portions of, Node.js, GitHub's Electron, WebKit, Chromium, Gecko, etc.

7. The method of claim 1, wherein at least one representation of the modification is given as an operational transform.

8. The method of claim 7, wherein at least one operational transform is communicated between an operational transform pair formed by a server-side operational transformation protocol engine and a client-side operational transformation protocol engine.

9. The method of claim 1, further comprising performing at least a portion of a client-local operational transformation protocol wherein local operational transformation pair data is received by a local operational transformation protocol engine.

10. The method of claim 9, wherein the client-local operational transformation protocol is performed when the user device is not connected to the remote cloud-based shared file facility.

11. The method of claim 10, wherein the local operational transformation protocol engine synchronizes with a client-side operational transformation protocol engine.

12. A non-transitory computer readable medium having stored thereon a sequence of instructions which, when executed by one or more processors causes a set of acts for collaborative editing of a cloud-based shared document using a browser-enabled platform native application, the set of acts comprising:
providing shared access to a document that is stored in a remote cloud-based shared file facility;
launching a platform native application from a user device of a first collaborating user;
establishing a non-browser connection between the platform native application and the remote cloud-based shared file facility, wherein the non-browser connection operates independently from a browser connection, wherein the non-browser connection is a connection over a communications protocol, and wherein the non-browser connection is an authenticated connection;
launching, by the platform native application an embedded browser that operates within the platform native application;
loading, by the embedded browser over a browser connection, a web application that executes within the embedded browser;
retrieving, from the remote cloud-based shared file facility a first user copy of the cloud-based shared document, wherein the first user copy of the cloud-based shared document is accessible by the web application; and
sending a modification of the first user copy of the cloud-based shared document to the remote cloud-based shared file facility to create a modified document that is exposed to one or more second collaborating users.

13. The non-transitory computer readable medium of claim 12, wherein the platform native application manages state transitions between at least two of, an active-online state, an active-offline state, an inactive-offline state or, an inactive-online state.

14. The non-transitory computer readable medium of claim 13, wherein the non-browser connection between the platform native application and the remote cloud-based shared file facility remains open during state transitions between at least two of, an active-online state, an active-offline state, an inactive-offline state or, an inactive-online state.

15. The non-transitory computer readable medium of claim 12, wherein the non-browser connection between the platform native application and the remote cloud-based shared file facility is a web socket connection over a websocket protocol.

16. The non-transitory computer readable medium of claim 12, wherein the set of acts further comprises:
closing the first user copy of the cloud-based shared document,
receiving, by the platform native application over the non-browser connection, at least one modification to the cloud-based shared document that originates from one of the one or more second collaborating users, and
applying the at least one modification to the first user copy before the first collaborating user reopens the first user copy of the cloud-based shared document.

17. The non-transitory computer readable medium of claim 12, wherein the embedded browser is formed from all or portions of, Node.js, GitHub's Electron, WebKit, Chromium, Gecko, etc.

18. The non-transitory computer readable medium of claim 12, wherein at least one representation of the modification is given as an operational transform.

19. A system for collaborative editing of a cloud-based shared document using a browser-enabled platform native application, the system comprising:
a storage medium having stored thereon a sequence of instructions; and
one or more processors that execute the sequence of instructions to cause the one or more processors to perform a set of acts, the set of acts comprising,
providing shared access to a document that is stored in a remote cloud-based shared file facility,
launching a platform native application from a user device of a first collaborating user,
establishing a non-browser connection between the platform native application and the remote cloud-based shared file facility, wherein the non-browser connection operates independently from a browser connection, wherein the non-browser connection is a connection over a communications protocol, and wherein the non-browser connection is an authenticated connection,
launching, by the platform native application an embedded browser that operates within the platform native application,
loading, by the embedded browser over a browser connection, a web application that executes within the embedded browser,
retrieving, from the remote cloud-based shared file facility a first user copy of the cloud-based shared document, wherein the first user copy of the cloud-based shared document is accessible by the web application, and
sending a modification of the first user copy of the cloud-based shared document to the remote cloud-based shared file facility to create a modified document that is exposed to one or more second collaborating users.

20. The system of claim 19, wherein the platform native application manages state transitions between at least two of, an active-online state, an active-offline state, an inactive-offline state or, an inactive-online state.

21. The system of claim 19, wherein the set of acts further comprise:
closing the first user copy of the cloud-based shared document,
receiving, by the platform native application over the non-browser connection, at least one modification to the cloud-based shared document that originates from one of the one or more second collaborating users, and
applying the at least one modification to the first user copy before the first collaborating user reopens the first user copy of the cloud-based shared document.

22. The system of claim 19, wherein at least one representation of the modification is given as an operational transform.

* * * * *